US007344071B2

(12) United States Patent
Cummings et al.

(10) Patent No.: US 7,344,071 B2
(45) Date of Patent: Mar. 18, 2008

(54) VOTING SYSTEM AND APPARATUS USING VOTER SELECTION CARD

(75) Inventors: Eugene M. Cummings, Lake Forest, IL (US); Gerald D. Hosier, Aspen, CO (US)

(73) Assignee: Automark Technical Systems LLC, Chicago, IL (US)

( * ) Notice: Subject to any disclaimer, the term of this patent is extended or adjusted under 35 U.S.C. 154(b) by 190 days.

(21) Appl. No.: 10/976,226

(22) Filed: Oct. 29, 2004

(65) Prior Publication Data

US 2005/0056698 A1 Mar. 17, 2005

Related U.S. Application Data

(63) Continuation-in-part of application No. 10/733,112, filed on Dec. 11, 2003, now Pat. No. 7,080,779, which is a continuation-in-part of application No. 10/454,276, filed on Jun. 4, 2003, now Pat. No. 7,222,787, which is a continuation-in-part of application No. 10/454,345, filed on Jun. 4, 2003, which is a continuation-in-part of application No. 10/347,528, filed on Jan. 17, 2003, now Pat. No. 7,100,828.

(60) Provisional application No. 60/348,919, filed on Jul. 26, 2002.

(51) Int. Cl.
*G06K 17/00* (2006.01)
*G06F 11/00* (2006.01)

(52) U.S. Cl. ........................................ 235/386; 705/12

(58) Field of Classification Search ................ 235/386; 705/12

See application file for complete search history.

(56) References Cited

U.S. PATENT DOCUMENTS 2,940,663 A 6/1960 Fechter, et al.

(Continued)

FOREIGN PATENT DOCUMENTS

JP 07246732 A 9/1995

OTHER PUBLICATIONS

Mercuri, Rebecca, A Better Ballot Box?, IEEE Spectrum, Oct. 2002, pp. 46-50 New York, New York, USA.

(Continued)

*Primary Examiner*—Karl Frech
*Assistant Examiner*—April A. Taylor
(74) *Attorney, Agent, or Firm*—Cook, Alex, McFarron, Manzo, Cummings & Mehler, Ltd.

(57) ABSTRACT

A voting system for storing voter input data on a voter selection card, which is capable of storing data for a plurality of candidates, and the system, subsequently, prints a ballot marked in accordance with data on the voter selection card. A voter-assist terminal receives a blank voter selection card, and then presents candidate selection options to the voter visually by means of an LCD touch screen menu and aurally by means of a synthesized speech menu. Candidate selections entered by means of the touch screen menu or by means of the audio menu are stored on the voter selection card, and the voter selection card is returned to the voter to take to a reader terminal. The reader terminal sends the stored data on the voter selection card to an attached printer which prints a marked ballot corresponding to the voter's selections. The ballot is inserted in a ballot scanning device, wherein the ballot is tallied and deposited in a locked ballot box.

11 Claims, 32 Drawing Sheets

U.S. PATENT DOCUMENTS

| | | | |
|---|---|---|---|
| 3,218,439 | A | 11/1965 | Holzer, et al. |
| 3,226,018 | A | 12/1965 | Railsback et al. |
| 3,233,826 | A | 2/1966 | Wiken |
| 3,441,714 | A | 4/1969 | Simjian |
| 3,620,587 | A | 11/1971 | Ahmann |
| 3,648,022 | A | 3/1972 | Cook |
| 3,653,587 | A | 4/1972 | Hammond et al. |
| 3,722,793 | A | 3/1973 | Aronoff |
| 3,733,469 | A | 5/1973 | Meyer |
| 4,021,780 | A | 5/1977 | Narey et al. |
| 4,066,871 | A | 1/1978 | Carson, Sr. et al. |
| 4,142,095 | A | 2/1979 | Cason, Sr. et al. |
| 4,236,066 | A | 11/1980 | Olmstead et al. |
| 4,373,134 | A | 2/1983 | Grace et al. |
| 4,479,194 | A | 10/1984 | Fogg et al. |
| 4,641,240 | A | 2/1987 | Boram |
| 4,649,264 | A | 3/1987 | Carson |
| 4,774,665 | A | 9/1988 | Webb |
| 4,807,908 | A | 2/1989 | Gerbel |
| 4,813,708 | A | 3/1989 | Narey |
| 4,981,259 | A | 1/1991 | Ahmann |
| 5,072,999 | A | 12/1991 | Trotta et al. |
| 5,189,288 | A | 2/1993 | Anno et al. |
| 5,213,373 | A | 5/1993 | Ramos |
| 5,218,528 | A | 6/1993 | Wise et al. |
| 5,248,872 | A | 9/1993 | Stewart |
| 5,278,753 | A | 1/1994 | Graft, III |
| 5,377,099 | A | 12/1994 | Miyagawa |
| 5,497,318 | A | 3/1996 | Miyagawa et al. |
| 5,535,118 | A | 7/1996 | Chumbley |
| 5,583,329 | A | 12/1996 | Davis, III et al. |
| 5,585,612 | A | 12/1996 | Harp, Jr. |
| 5,610,383 | A | 3/1997 | Chumbley |
| 5,635,726 | A | 6/1997 | Zavislan et al. |
| 5,666,765 | A | 9/1997 | Sarner et al. |
| 5,732,222 | A | 3/1998 | Miyagawa et al. |
| 5,758,325 | A | 5/1998 | Lohry et al. |
| 5,764,221 | A | 6/1998 | Willard |
| 5,821,508 | A | 10/1998 | Willard |
| 5,875,432 | A | 2/1999 | Sehr |
| 5,878,399 | A | 3/1999 | Peralto |
| 6,078,902 | A | 6/2000 | Schenkler |
| 6,079,624 | A | 6/2000 | Apperson et al. |
| 6,081,793 | A | 6/2000 | Challener et al. |
| 6,134,399 | A | 10/2000 | Hino et al. |
| 6,194,698 | B1 | 2/2001 | Zavislan et al. |
| 6,250,548 | B1 | 6/2001 | McClure et al. |
| 6,412,692 | B1 | 7/2002 | Miyagawa |
| 6,457,643 | B1 | 10/2002 | Way et al. |
| 6,694,045 | B2 | 2/2004 | Chung |
| 6,769,613 | B2 | 8/2004 | McDermott et al. |
| 2001/0013547 | A1 | 8/2001 | Kotob et al. |
| 2001/0034640 | A1 | 10/2001 | Chaum |
| 2001/0035455 | A1 | 11/2001 | Davis et al. |
| 2002/0038819 | A1 | 4/2002 | Ushioda et al. |
| 2002/0066780 | A1 | 6/2002 | Balolia |
| 2002/0074399 | A1 | 6/2002 | Hall et al. |
| 2002/0075246 | A1 | 6/2002 | Zheltukhin |
| 2002/0077885 | A1 | 6/2002 | Karro et al. |
| 2002/0077886 | A1 | 6/2002 | Chung |
| 2002/0078358 | A1 | 6/2002 | Neff et al. |
| 2002/0084325 | A1 | 7/2002 | Reardon |
| 2002/0087394 | A1 | 7/2002 | Zhang |
| 2002/0092908 | A1 | 7/2002 | Chumbley |
| 2002/0107724 | A1 | 8/2002 | Openshaw, II et al. |
| 2002/0133396 | A1 | 9/2002 | Barnhart |
| 2002/0134844 | A1 | 9/2002 | Morales |
| 2002/0138341 | A1 | 9/2002 | Rodriguez |
| 2002/0143610 | A1 | 10/2002 | Munyer |
| 2002/0161628 | A1 | 10/2002 | Poor et al. |
| 2003/0026462 | A1 | 2/2003 | Chung |
| 2003/0034393 | A1 | 2/2003 | Chung |
| 2003/0062411 | A1 | 4/2003 | Chung et al. |
| 2003/0136835 | A1 | 7/2003 | Chung |
| 2003/0173404 | A1 | 9/2003 | Chung |
| 2003/0178484 | A1 | 9/2003 | Vadura et al. |
| 2004/0046021 | A1 | 3/2004 | Chung |
| 2004/0140357 | A1 | 7/2004 | Cummings |
| 2004/0169077 | A1 | 9/2004 | Petersen et al. |
| 2004/0195323 | A1 * | 10/2004 | Vadura et al. .............. 235/386 |

OTHER PUBLICATIONS

DeCarvalho, Luiz Pinto, Electronic Elections, IEEE Spectrum, Feb. 2003, p. 15, New York, New York, USA.

Kofler, Robert; Krimmer, Robert; Prosser, Alexander, Electronic Voting: Algorithmic and Implementation Issues, IEEE Computer Society, New York, New York, USA.

Bellinger, Robert, Can We Be Spared a Repeat of Election 2000?, IEEE Feb. 2001, pp. 1-3, New York, New York, USA.

* cited by examiner

VOTING SYSTEM AND APPARATUS USING VOTER SELECTION CARD

CROSS-REFERENCE TO RELATED APPLICATIONS

This application claims benefit as a Continuation-in-Part of application Ser. No. 10/733,112 filed Dec. 11, 2003 now U.S. Pat. No. 7,080,779 which claims benefit as a Continuation-in-Part of application Ser. No. 10/454,276 filed Jun. 4, 2003 now U.S. Pat. No. 7,222,787 and application Ser. No. 10/454,345 filed Jun. 4, 2003, which claim benefit as Continuations-in-Part of application Ser. No. 10/347,528, filed Jan. 17, 2003, now U.S. Pat. No. 7,100,828 which claims benefit under 35 U.S.C. § 119(e) of U.S. Provisional Application, Ser. No. 60/348,919, filed Jul. 26, 2002, the complete disclosure thereof being incorporated by reference.

BACKGROUND OF THE INVENTION

Traditionally, elections for public office in the United States have been conducted with voting systems utilizing hand-marked paper ballots. Typically, in such systems a paper ballot is issued to a verified voter by an election judge. The voter takes the ballot to a voting booth, where he or she manually marks his or her selections by placing marks or punch holes in marking spaces associated with the candidates he or she selects. The marked ballot is then taken by the voter to a ballot box where it is inserted and stored for subsequent hand or machine counting.

In recent years, the traditional system has been improved with the use of a ballot scanner to tally the hand-marked ballots as they are inserted into the ballot box. This has the advantage of making vote tallies immediately available at the close of polling, and, with scanners so-equipped, of preventing unintentional under-votes and over-votes. However, one drawback of the traditional system remains in that there is no provision for assisting voters who have a physical impairment, which would interfere with the manual marking of a ballot. Previous attempts at assisting such impaired voters have utilized electronic voting terminals wherein, instead of presenting candidate choices on a paper ballot, candidate choices are serially presented to the voter on large, easily viewable touch-screen displays. When the voter has made his or her selections, the results are tallied within the voting terminal, the total votes for each candidate being read from the terminal electronically or by means of a paper tape at the close of the polling place.

One drawback of electronic voting terminals is that there is no satisfactory means for auditing the voting process, i.e. confirming that each vote is tallied as voted, and that no votes are tallied which were not voted. Furthermore, there is no means for an individual voter to confirm that his or her vote has actually been counted. Attempts at addressing these deficiencies have centered on the use of a paper tape or slip printed concurrently with each voter's voting. Such tapes and slips, which bear little or no resemblance to a ballot, have proven difficult to interpret by the voter and do not confirm that the vote has been actually tallied.

These drawbacks are overcome by the voting system and apparatus of the invention, wherein a blank voter selection card issued to the voter is inserted into the voter assist terminal of the invention, and the contests are presented to the voter on a series of touch screen displays. After the voter enters and confirms his or her selections, the selection data is stored on the voter selection card and the card is returned to the voter for insertion into a card reader terminal in which the voter selection card data is read and utilized by an associated printer to print a ballot with the selections appropriately marked. The marked ballot is inserted into a scanner for tabulation and then deposited in a locked ballot box.

Accordingly, it is the general object of the invention to provide a new and improved voting system, method and apparatus.

It is a more specific object of the invention to provide an improved voting system, method and apparatus wherein a blank voter selection card is issued to voters by an election judge, the voter selection card is inserted into a voter-assist terminal wherein voters' selections, made by means of a visual or audio voter interface, are stored on the voter selection card. The card is subsequently taken to a reader wherein the selection data is read to develop output signals which are utilized by a printer to print ballots marked in accordance with the data on the voter selection card.

SUMMARY OF THE INVENTION

The invention is directed to a voting system for recording voter selections from one or more election contests. The system comprises a voter selection card, a voter-assist terminal adapted to receive, store data onto and return the voter selection card, a reader terminal adapted to receive the voter selection card, a printer adapted to receive data from the reader terminal, the voter selection card being adapted to receive at least one data bit indicating the voter's selection of a candidate from one or more election contests, the voter selection card providing storage space for the data bit, the voter-assist terminal displaying to the voter one or more menus presenting a choice of candidates from the election contests and receiving an input from the voter indicating the selection of a candidate from the election contests, the voter-assist terminal receiving the voter selection card and in response to the voter input, storing the voter input on the voter selection card corresponding to the selected candidate and returning the voter selection card to the voter, the reader terminal receiving the voter selection card and reading the voter selections, and providing a signal for utilization by the printer for printing a ballot marked in accordance with the voters' selections.

The invention is directed to a voting system utilizing a voter selection card given to a voter for recording selections of a voter via a voter-assist terminal, a reader terminal adapted to receive and read the voter selection card, and a printer for printing a marked ballot in accordance with voter input. The voter-assist terminal comprises a transport mechanism for receiving the voter selection card, a memory device for storing ballot format data, a user interface responsive to the format data for providing to the voter one or more menus presenting a choice of candidates from the slate of candidates, and for receiving an input from the voter indicating the voter's selection of a candidate from the slate of candidates, and a card reader/writer device responsive to the voter input for reading and storing voter input data on the voter selection card.

The invention is directed to a voting system utilizing a voter selection card given to a voter for recording selections of a voter via a voter-assist terminal, a reader terminal adapted to receive and read the voter selection card, and a printer for printing a marked ballot in accordance with voter input. The reader terminal comprises a transport mechanism for receiving the voter selection card, an indicator relating status of the reader terminal, a memory device for storing ballot format data, a card reader device responsive to the voter selection card for reading voter input data on the voter selection card for generating a signal for application to the printer to print a ballot marked in accordance with the voter selections.

The invention is directed to a voting system utilizing a voter selection card given to a voter for recording selections of a voter via a voter-assist terminal, a reader terminal adapted to receive and read the voter selection card, and a printer for printing a marked ballot in accordance with voter input. The method comprises an election judge distributing a voter selection card to a voter, the voter receiving the voter selection card to insert into the voter-assist terminal, the voter making voting selections via a visual and audio interface and storing the selections on the voter selection card via the voter-assist terminal, the terminal discharging the voter selection card to the voter to insert in the reader terminal, the reader terminal reading voter input data and sending the data to the printer, the printer printing out a printed ballot marked in accordance with voter input data, the voter receiving the printed marked ballot and inserting into a scanner, the scanner tabulating the printed marked ballot, and the printed marked ballot being deposited into a ballot box.

DESCRIPTION OF THE PREFERRED EMBODIMENT

Figure 1:
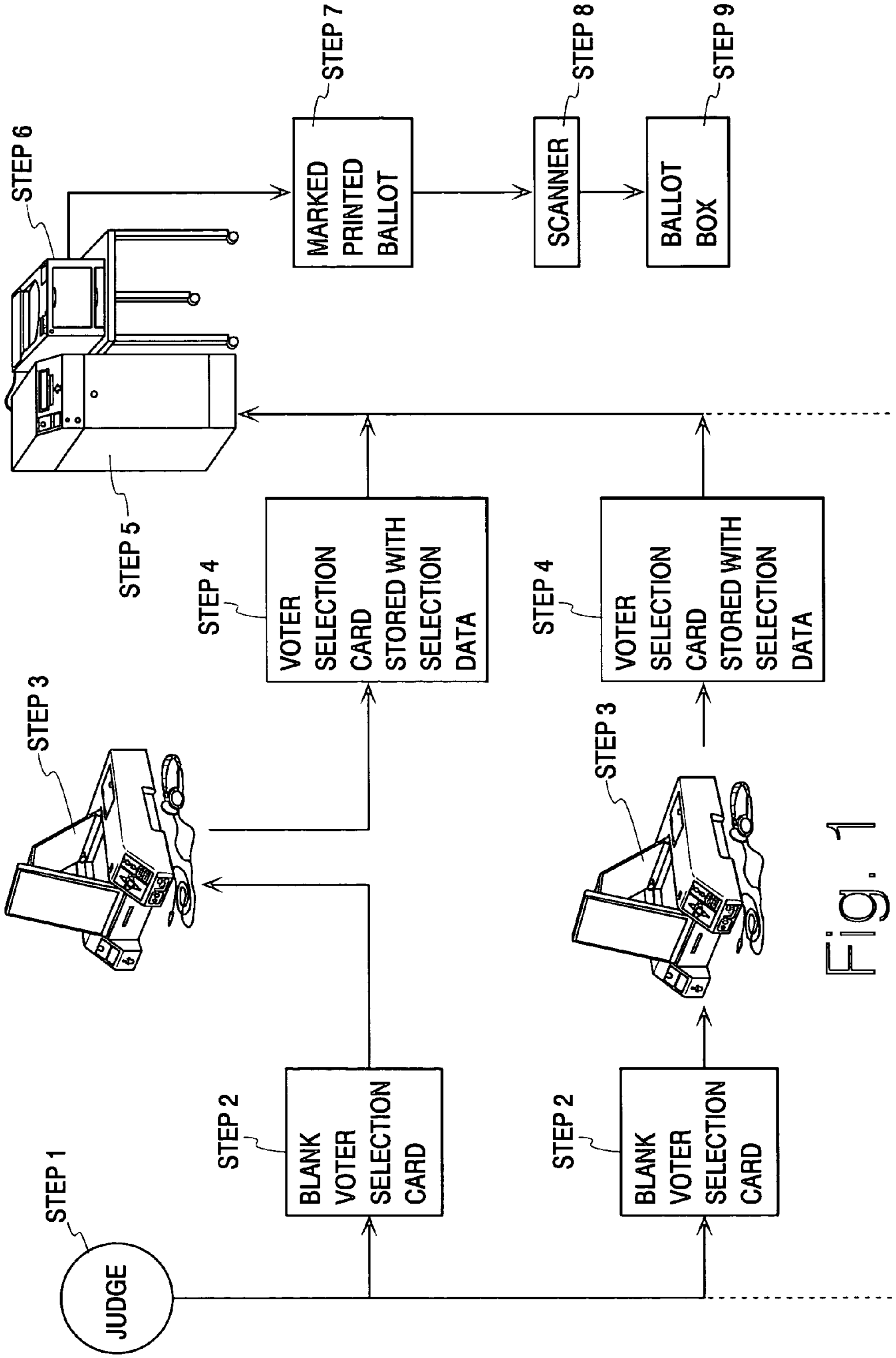
FIG. 1 is a general step process overview of the voting system of the invention.

Referring to FIG. 1, a general voting process in accordance with the invention is seen to include an election judge distributing blank voter selection cards to voters in step 1. The voter then takes the blank voter selection card to a voter assist terminal in step 2. In step 3, the voter makes voting selections by means of a visual or audio interface, and then those selections are stored on the voter selection card. The stored voter selection card is returned to the voter to be taken to a reader terminal in step 4. The voter inserts the stored voter selection card into the reader terminal in step 5 in which the stored selection data is sent to an attached standard printer in step 6 to print a marked ballot corresponding to the voter selection data, and then the marked ballot is taken by the voter in step 7. The voter inserts the printed marked ballot into a scanner for tabulation in step 8, and then the ballot is deposited into a ballot box in step 9.

Figure 2:
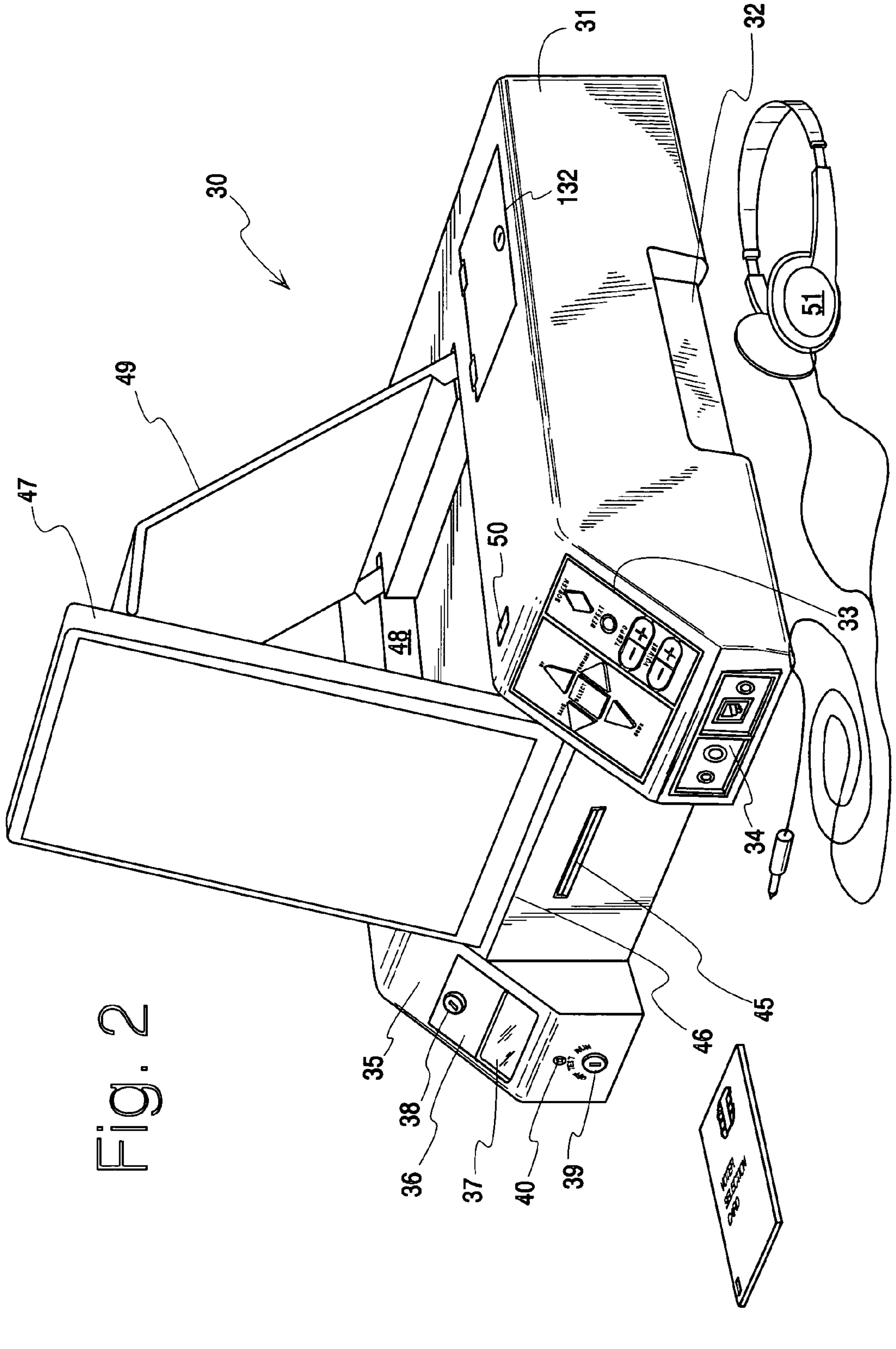
FIG. 2 is a perspective view of the voter-assist terminal invention constructed in accordance with the invention showing the terminal in an operating position.
Figure 3:
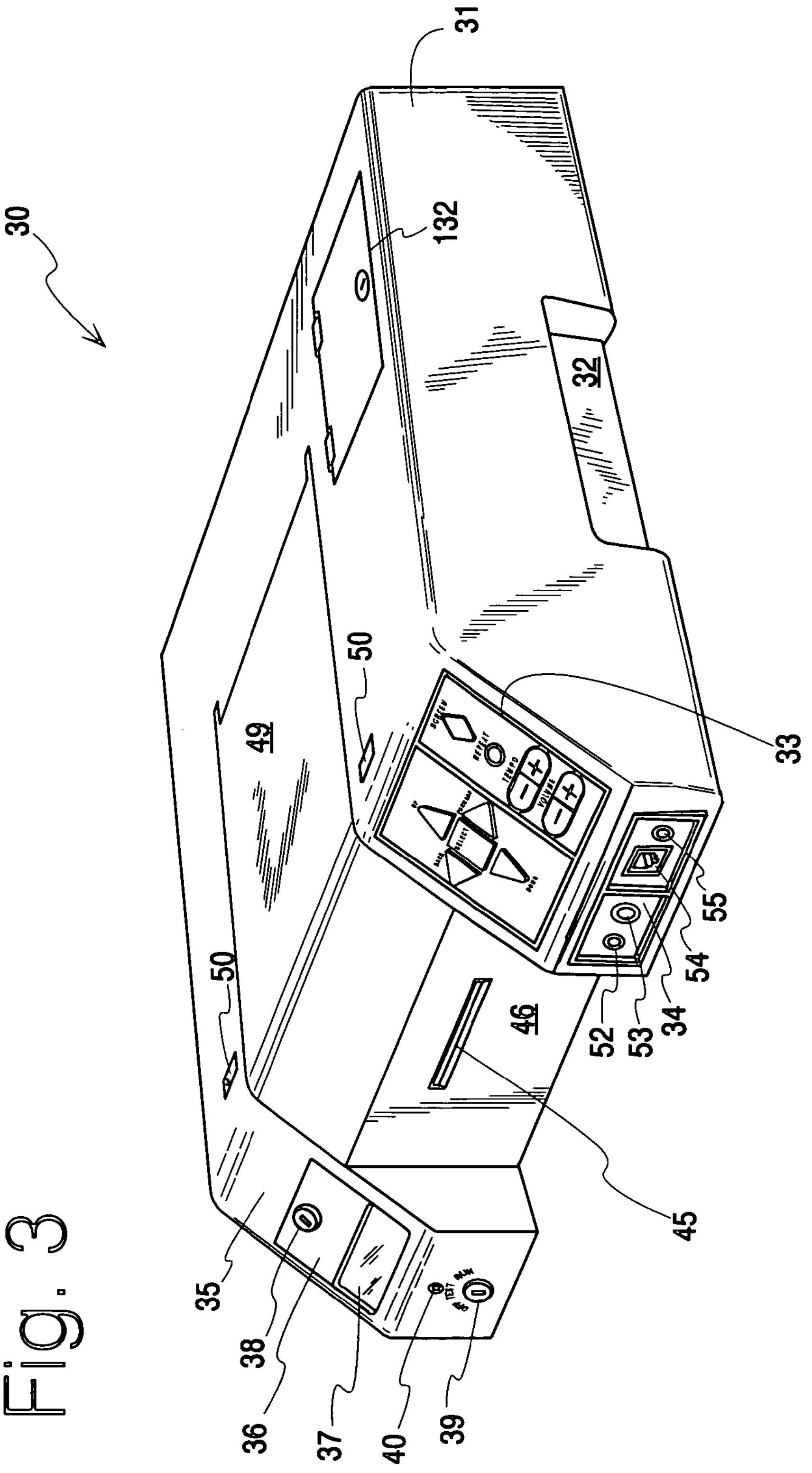
FIG. 3 is a perspective view of the voter-assist terminal of FIG. 2 showing the terminal in a closed position.

Referring to the figures, and particularly to FIGS. 2 and 3, a voter-assist terminal 30 constructed in accordance with the invention for use in the system of FIG. 1 is seen to include a generally rectangular housing 31 having a pair of opposed handle portions 32 to facilitate placing the terminal in an operating position on a table or other support surface (not shown). The front face of the terminal housing 31 includes on its right side a sloped voter interface panel 33 and a vertically disposed interconnect panel 34. Housing 31 further includes on the left side of its front surface a sloped panel 35 which includes an access door 36 for providing access to a memory card (not shown) in FIGS. 2 and 3 installed within the terminal to provide data regarding the style or format of ballots which is processed for voter selections. The transparent window 37 in access door 36 enables the access card to be viewed from the exterior of the terminal so that installation of the proper access card can be readily confirmed. A key lock 38 in the access door prevents unauthorized access to the data card.

A three-position key switch 39 is provided on a vertical left side panel of housing 31 to enable the operating mode of voter-assist terminal 30 to be set. This key switch includes OFF, ON and TEST positions which can be selected by officials at the polling place and which the voter-assist terminal is being used. An LED status light 40 above key switch 39 indicates the powered-up status of the terminal. In a preferred embodiment, this light displays a steady green to indicate operation on an AC line power with a fully charged battery, or a blinking green to indicate operation on the AC line with an inadequately charged battery. During battery operation, the LED status light displays a steady amber with the battery adequately charged, or a blinking amber with the battery inadequately charged. A power switch (not shown) on the rear panel of housing 31 provides a positive disconnect of all power from the terminal.

Figure 29:
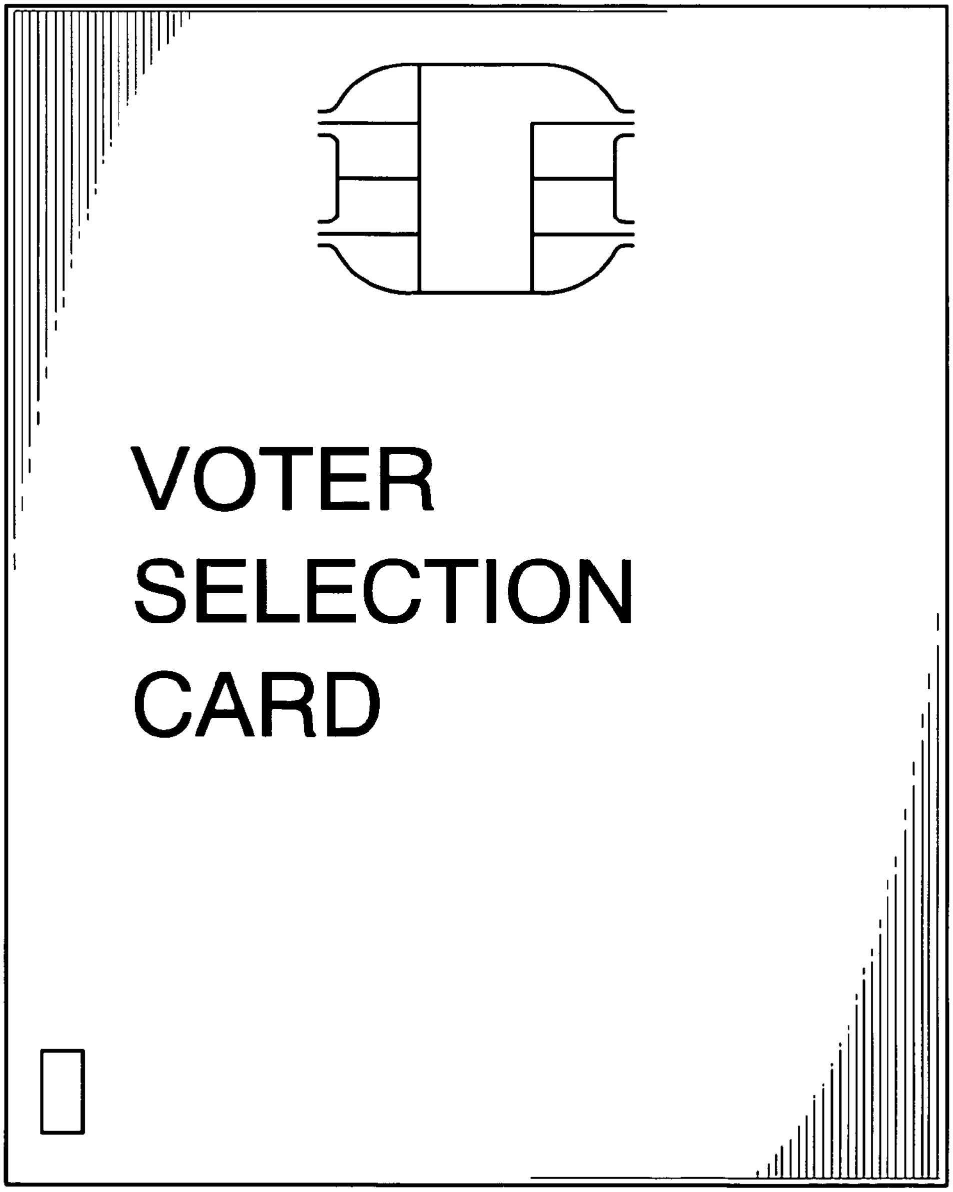
FIG. 29 shows a general voter selection card for storing and reading contest selection data.

To provide for insertion and discharge of a voter selection card (FIG. 29), housing 31 includes at its front end a voter selection card receiving slot 45.

To provide a visual interface with a voter, voter-assist terminal 30 includes an LCD touch screen assembly 47 which is pivotally mounted to housing 31 such that the display can pivot from a closed position in a recess 48 provided in the top surface of the housing to a generally vertical operating position as shown in FIG. 2. A cover 49 pivotally mounted to housing 31 along its rear edge engages the rear surface of display assembly 47 to support the display assembly in its operating position as shown in FIG. 2, and pivots over recess 48 to cover display assembly 47 when the display assembly is stored in recess 48, as shown in FIG. 3. A pair of slide latches 50 may be provided on the top surface of housing 31 to lock cover 49 closed for transit. Alternatively, one or more latch assemblies (not shown) may be provided on the outer surfaces (when closed as in FIG. 3) of panel 46 and cover 49 to lock two members together, thereby securing the members for transit.

Figure 4:
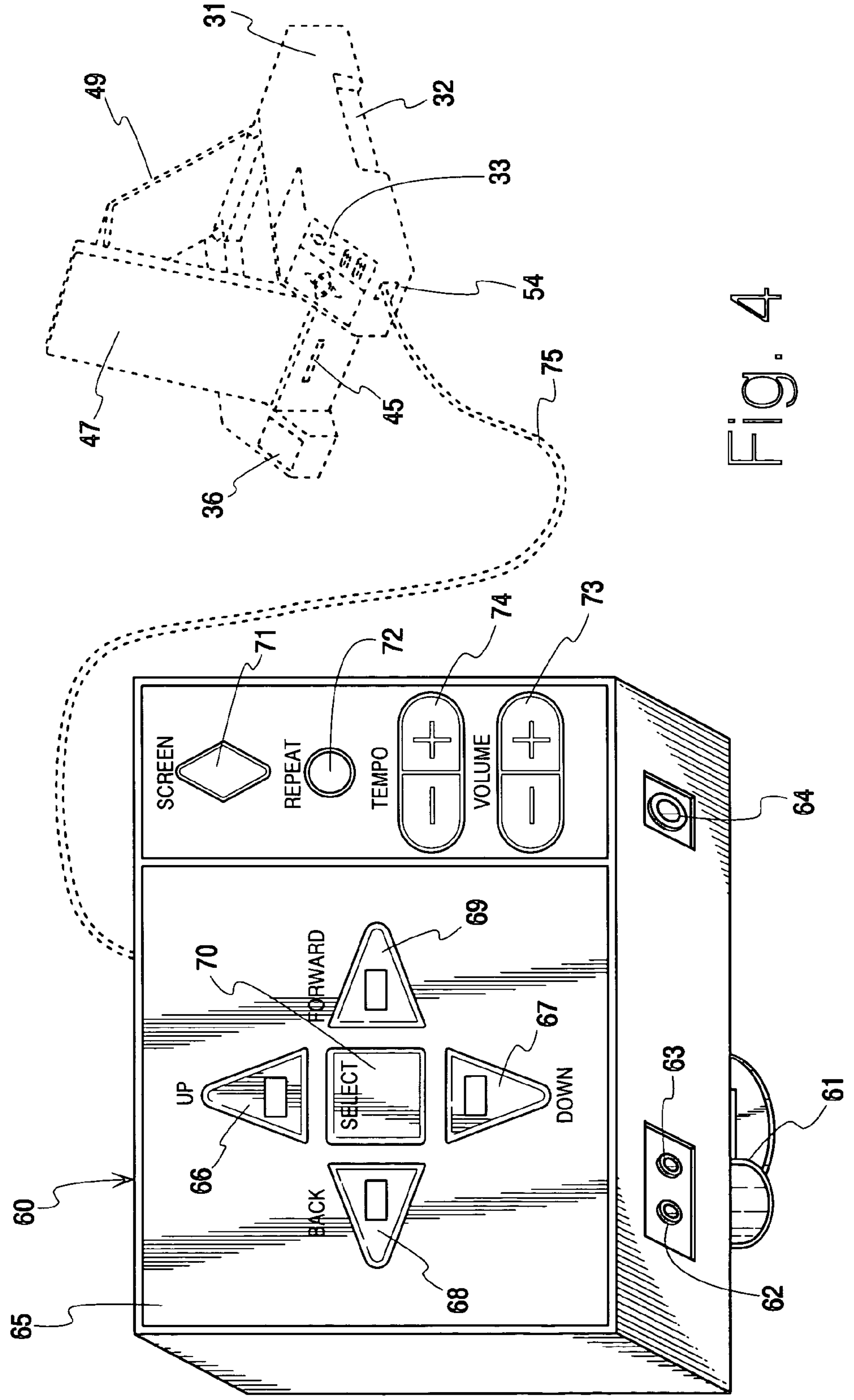
FIG. 4 is an enlarged perspective view of a remote user interface module for use with the voter-assist terminal of FIGS. 2 and 3.

An audio interface with the voter is provided by a pair of headphones 51 which plug into one of two audio jacks 52 and 53 (FIG. 3) on the front right surface of housing 31. Audio jack 52 is preferably a one-eighth inch jack and audio jack 53 is preferably a one-quarter inch jack. An additional jack 54 is provided for connection to a remote voter interface module such as shown in FIG. 4. An additional ADA jack 55 provides for connection to a two-contact "sip and puff" device.

Referring to FIG. 4, a remote voter interface module 60 may be optionally provided to permit voters to perform functions provided by voter interface keypad 33 while seated at a remote location, such as in a wheelchair. The module includes a clamp assembly 61 which may include pivoting features to permit the module to be mounted to a supporting surface, such as, for example, the arm of a wheelchair. A pair of audio jacks 62 and 63 provide standard one-eighth inch and one-fourth inch connections for headphones and an ADA jack 64 provides for connection to a conventional two-contact "sip and puff" device in the manner of jack 34. A keypad 65 on module 60 provides the same key switch inputs as are provided on keypad 33. In particular, a pair of arrow-shaped UP and DOWN keys 66 and 67 provide for up and down navigation, respectively, on the display screen of display assembly 47 or within a complementary audio menu. A pair of arrow-shaped keys 68 and 69 provide for back (BACK) and forward (NEXT) navigation, respectively, on the display screen of display assembly 47 or in the conforming audio menu. A SELECT key 70 provides for selection of a particular choice on the display screen or the audio menu.

Four additional function keys are provided to assist the voter when using the audio interface. In particular, a diamond-shaped SCREEN blanking key 71 enables the voter to selectively disable, or blank the display screen of display assembly 47 for improved privacy when voting using the audio interface. A round REPEAT key 72 enables the voter to request that a name or phrase provided by the audio interface be selectively repeated. A rocker-type VOLUME switch 73 enables the audio level of the audio interface to be selectively increased or decreased, and a rocker-type TEMPO key 74 enables the voter to selectively increase or decrease the rate at which synthesized audio is provided by the audio interface. Both of these functions return to nominal settings upon the insertion of a voter selection card so that each subsequent user can make his or her own adjustment from a fixed nominal setting. Module 60 is preferably connected to terminal 30 by a flexible cable 75, although it is contemplated a wireless RF or JR link could be used instead.

Figure 5A:
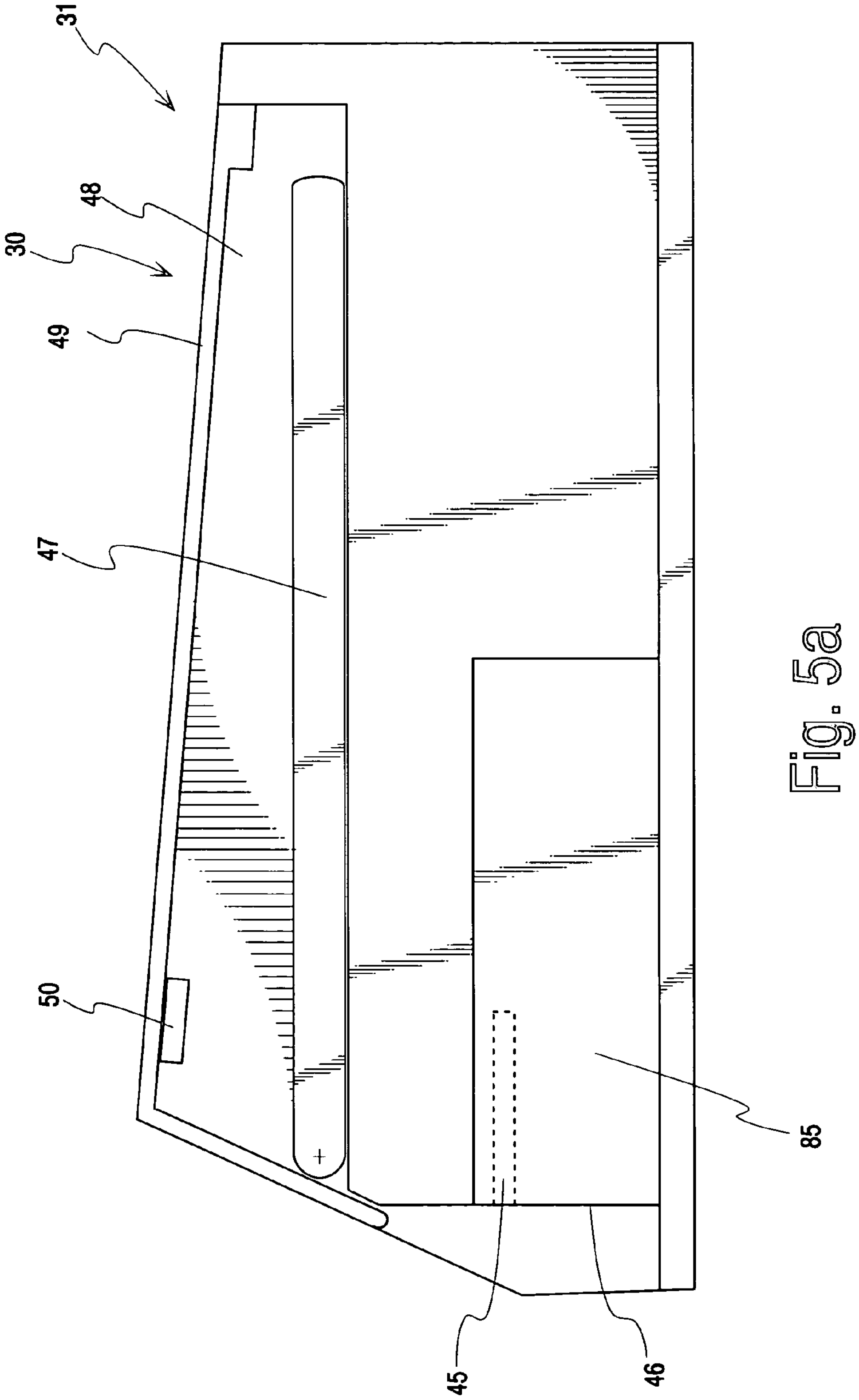
FIG. 5*a* is a simplified cross-sectional view of the voter-assist terminal of FIGS. 2 and 3 showing the terminal in its closed storage or transit condition.
Figure 5B:
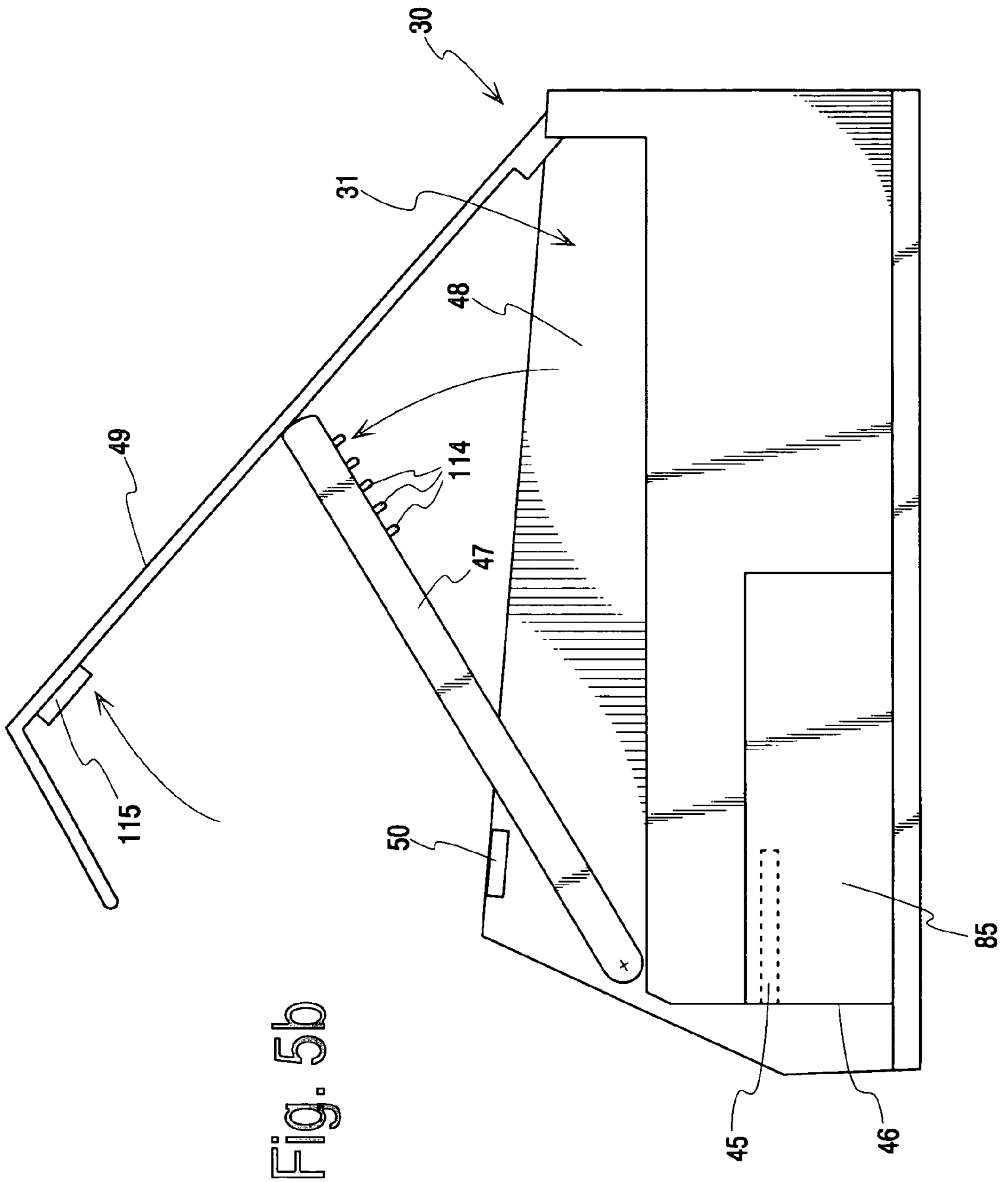
FIG. 5*b* is a simplified cross-sectional view of the voter-assist terminal similar to FIG. 5*a* showing the terminal in the process of being opened for use.
Figure 5C:
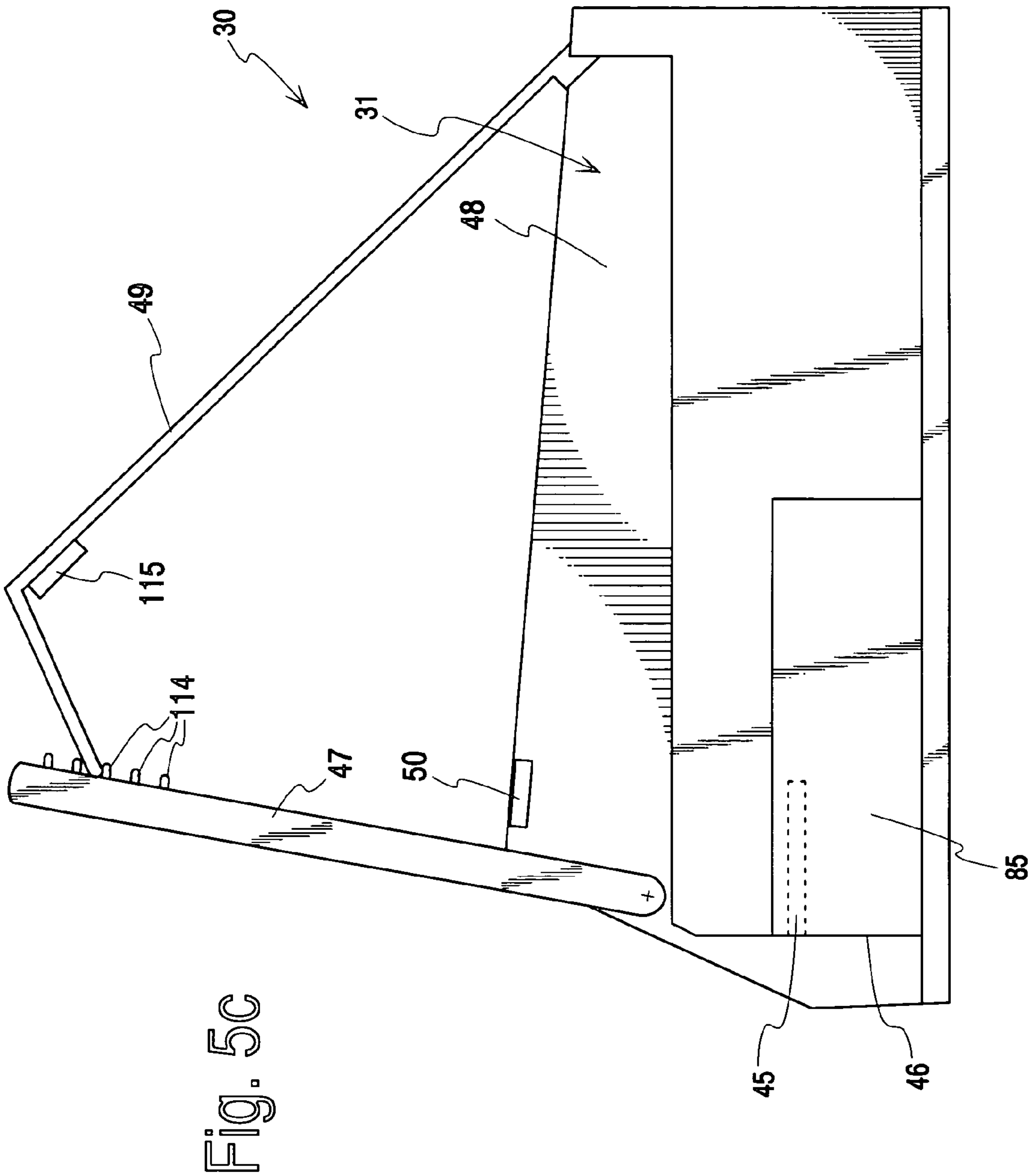
FIG. 5*c* is a simplified cross-sectional view of the voter-assist terminal similar to FIG. 5*a* showing the terminal in an open operating condition.

An identical set of voter interface key switches is provided on interface panel 33. In particular, as better shown in FIG. 8, interface panel 33 includes arrow-shaped UP and DOWN navigation keys 76 and 77, arrow-shaped BACK and FORWARD navigation keys 78 and 79, respectively, and a square-shaped, centrally located SELECT key 80. These keys have the same functions in the audio interface protocol as the previously described navigation keys 66-70 of interface module 60. In addition, voter interface panel 33 includes a diamond-shaped SCREEN display blanking key 81, a round REPEAT key 82, and rocker-type VOLUME and TEMPO keys 83 and 84, respectively. The relationship between display assembly 47, cover 49 and housing 31 is shown in FIGS. 5*a*-5*c*. In FIG. 5*a*, voter-assist terminal 30 is shown in a closed or transit state with cover 49 in its closed position. Display assembly 47 is protected within recess 48 by cover 49.

Also shown in FIG. 5*a* is the voter selection card reader/writer 85 through which a voter selection card (FIG. 29) is conveyed when inserted into voter-assist terminal 30. When a voter selection card is introduced through receiving slot 45 and then rests in voter selection card reader/writer 85, a series of screens is presented to the viewer on the display screen module 47 or by the audio menu controlled by voter interface key switch panel 33 to enable the voter to make his or her choices of the candidates in a contest. After the selection process is complete, voter selection card reader/writer 85 stores the contest selection data into the voter selection card. After the data is stored, the voter selection card is discharged through receiving slot 45.

As shown in FIG. 5*b*, conversion of voter-assist terminal 30 from a storage or transit condition to an operating condition is first accomplished by pivoting cover 49 upwardly away from recess 48 and then pivoting display assembly 47 forward toward the front of the unit. When display assembly 47 has been pivoted to its viewing position, cover 49 is pivoted forward until the front edge of the cover engages a selected one of a plurality of ridges 114 on the rear surface of the assembly shown in FIG. 5*c*. By selecting which ridges engage cover 49, viewing angle of the display assembly 47 can be varied to suit voter preferences. Cover 49 preferably includes a latch engaging member 115 for engaging the sliding latch 50 when the cover is in its storage position as shown in FIG. 5*a*.

Figure 6:
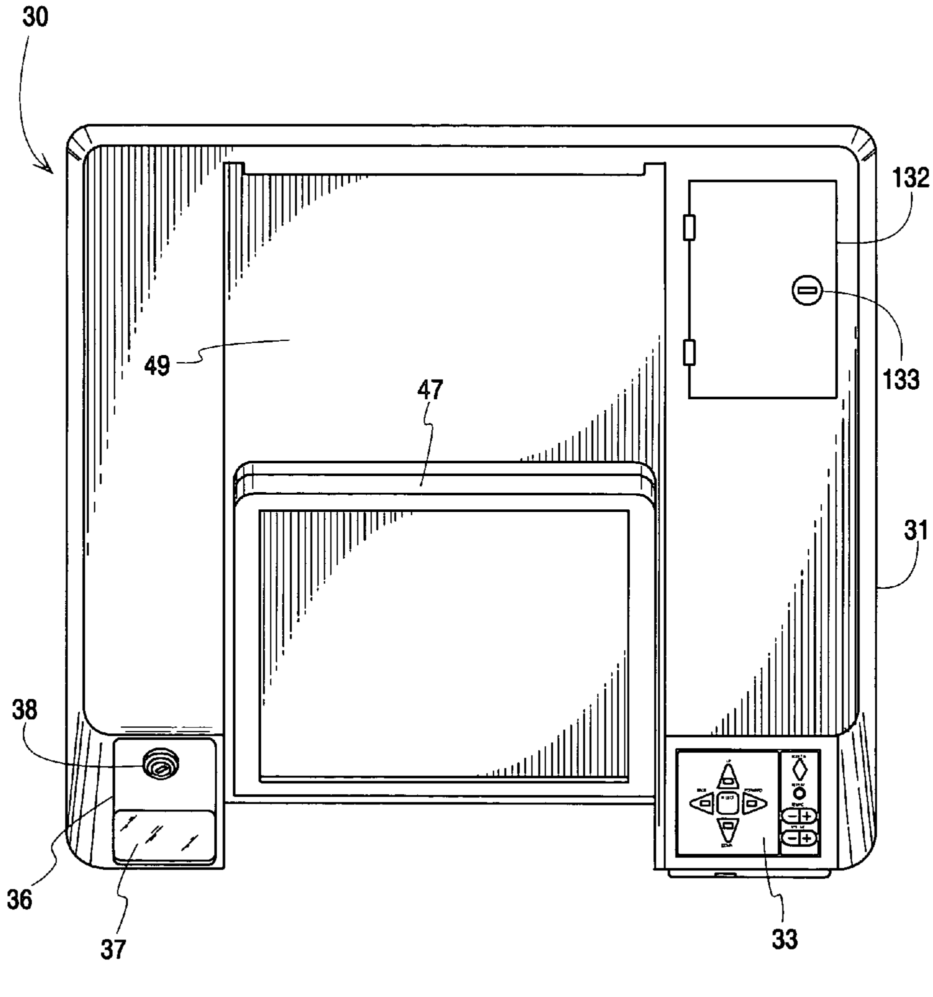
FIG. 6 is a top view of the voter-assist terminal of FIGS. 2 and 3 showing principal exterior housing features thereof.

Referring now to FIG. 6, voter-assist terminal 30 may include a battery access door 132. A key lock assembly 133 may be provided to prevent unauthorized access to the battery.

Figure 7:
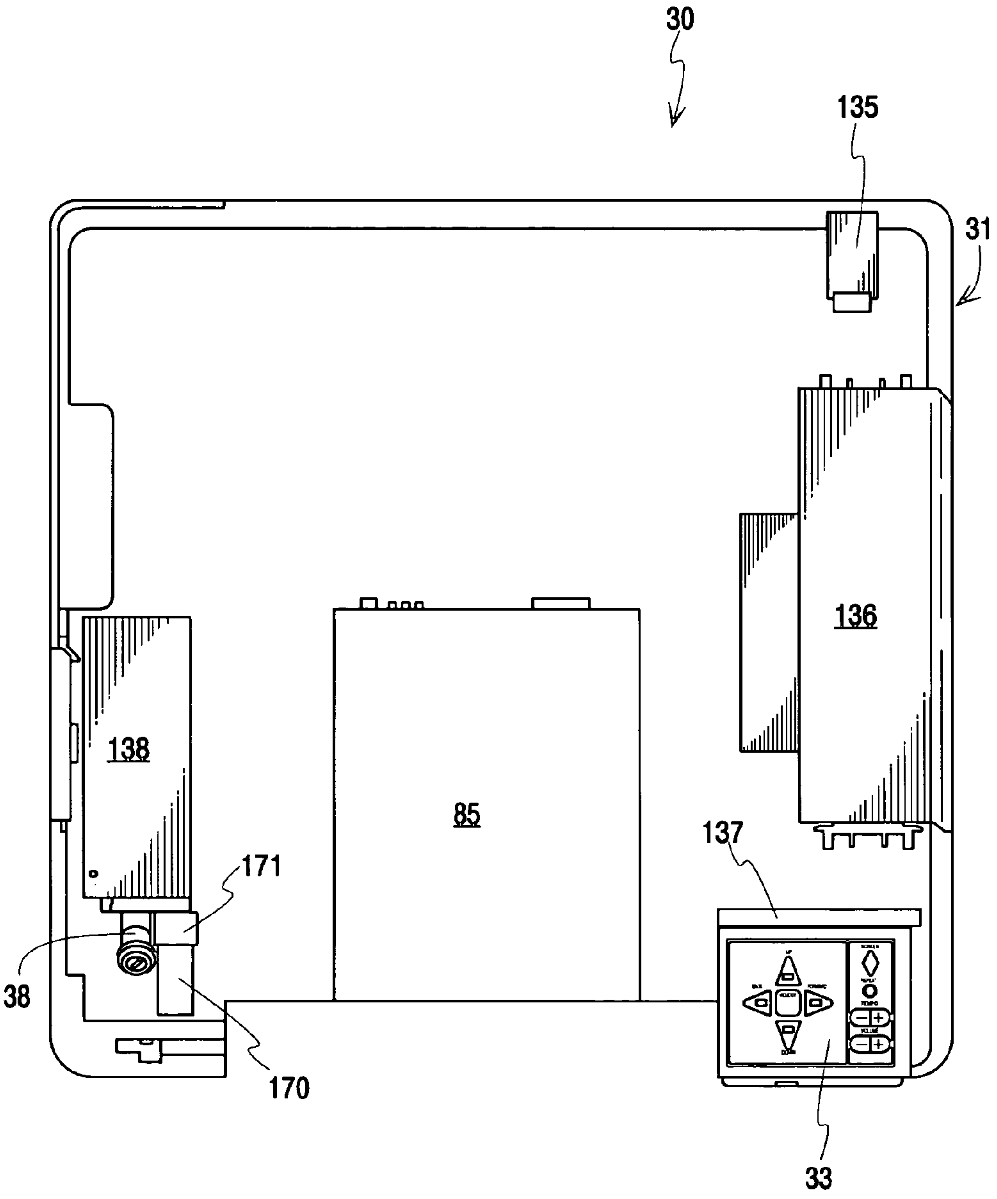
FIG. 7 is a top perspective view of the voter-assist terminal with the top section of the housing removed to show the principal interior components of the terminal.

Voter selection card reader/writer 85 of voter-assist terminal 30 is shown in FIG. 7, which depicts the terminal with the top section of the housing removed. Additional components seen in FIG. 7 include a receptacle 135 for receiving AC power, a power supply module 136, a key switch interface module 137 and a processor assembly 138.

Figure 8:
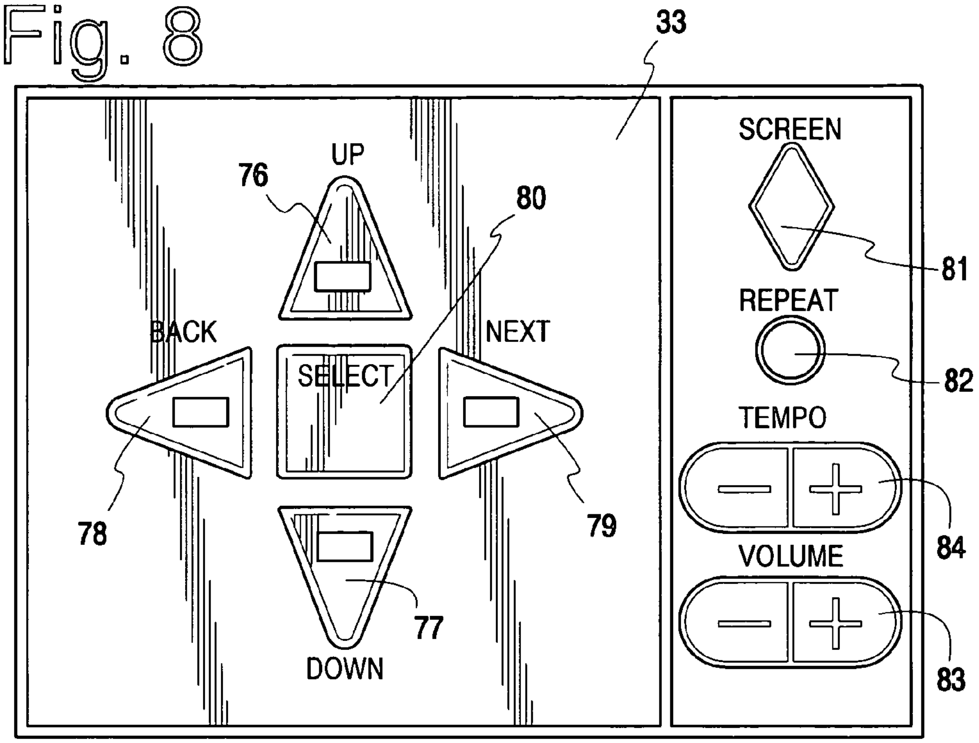
FIG. 8 is an enlarged front elevational view of the user interface keyboard of the voter-assist terminal.

Referring to FIG. 8, the user interface key switch panel 33 is advantageously formed from a seamless flexible plastic membrane for easy maintenance and cleaning. Keys are preferably recessed and are of a positive-action such that the user is provided tactile feedback that his actuation of a switch has occurred. Furthermore, raised rims are preferably provided around each key to make the shapes more easily discerned by touch. The entire switch assembly is preferably removable from housing 31 so that alternative keyboard arrangements can be readily provided if desired.

Figure 9:
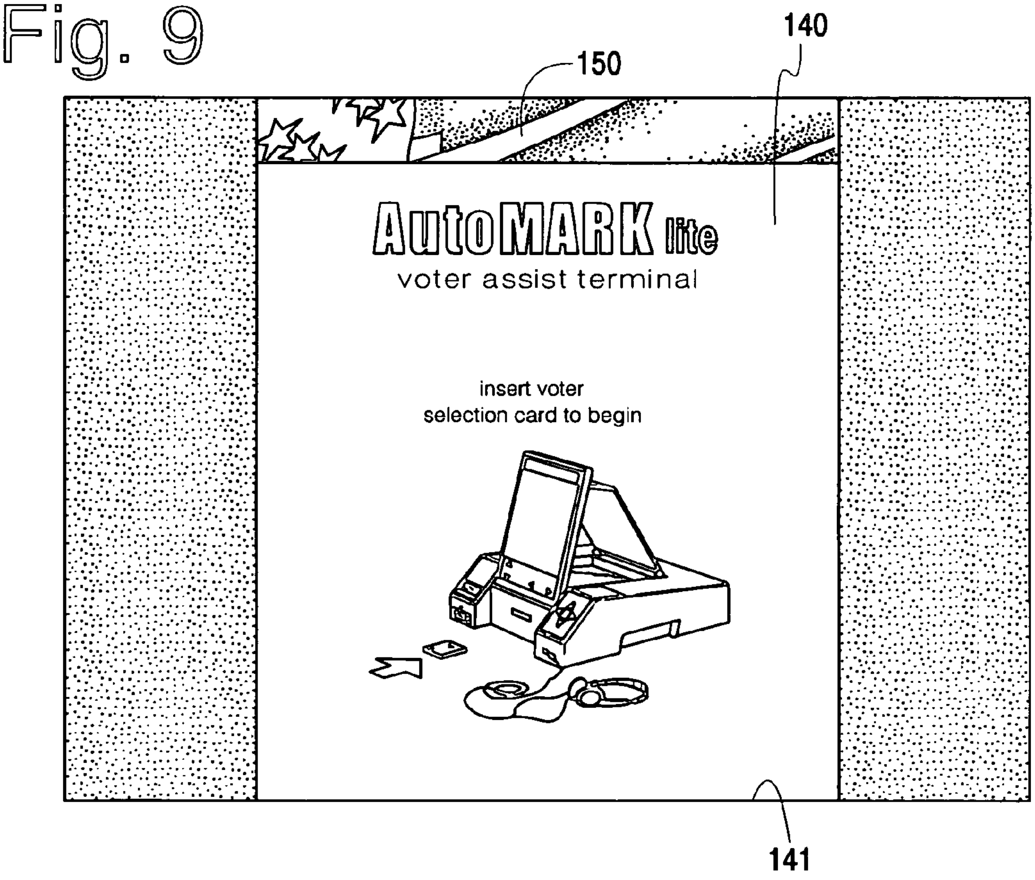
FIG. 9 is a depiction of a typical initial display screen presented to the user prior to insertion of a voter selection card into the voter-assist terminal for storing contest selection data.

Referring to FIG. 9, upon initial power-up of voter-assist terminal 30, an introductory screen is preferably displayed on the LCD screen 141 provided by display assembly 47. This introductory display may be customized in accordance with the requirements of the election jurisdiction utilizing the voter-assist terminal. In the present embodiment, the screen is configured to prompt the voter to insert his or her voter selection card into the terminal.

Figure 10:
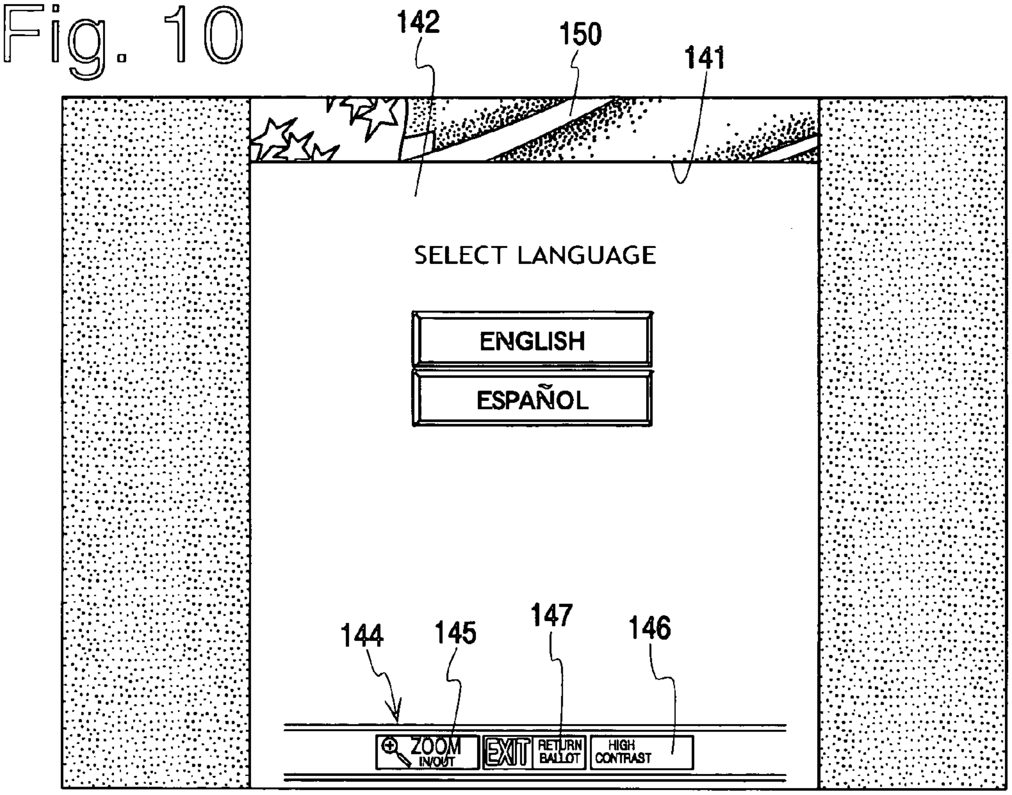
FIG. 10 is a depiction of a subsequent display screen presented to the user to enable the user to select a language in which subsequent prompts are to be presented.
Figure 11:
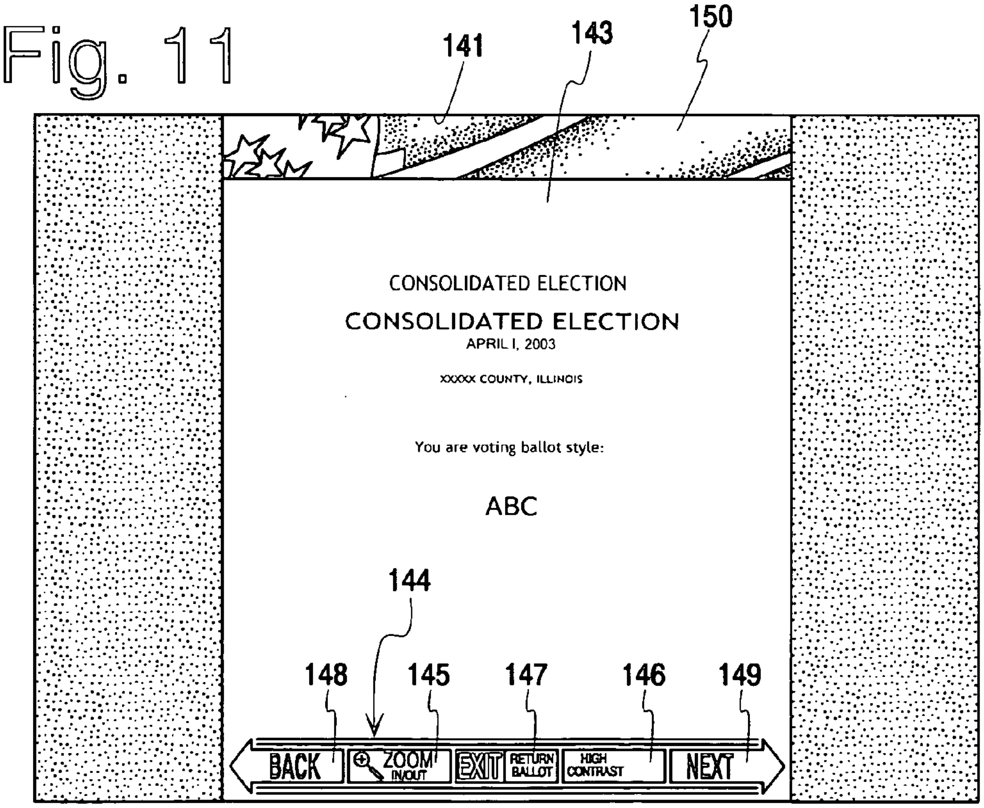
FIG. 11 is a depiction of a display screen which appears after display screen of FIG. 10 showing the details of the election.

Once a voter selection card has been inserted, the voter is next prompted by a screen 142 shown in FIG. 10 to select a language in which he desires to receive assistance in making voter selections. In the present instance, two languages, English and Spanish, are provided for selection. After a language is selected by touching the appropriate portion of touch screen 141, the next screen 143, shown in FIG. 11, is displayed. It should be noted that screen 142, like many subsequent screens, provides a function bar 144 a means by which a voter can perform certain functions. In particular, a zoom function is provided at 145 by which the display is increased in size. The first actuation of the zoom icon enlarges the display and a second actuation returns the display to its normal size. Another function provided on function bar 144 is a high contrast function 146 which causes the color display on the LCD screen to change to a monochrome high contrast display for those voters having difficulty reading the screen because of an inability to discern colors. Also provided on function bar 144 is an exit function 147 which causes the selection process to be terminated and the voter selection card to be returned to the voter through feed slot 45. In practice, this function may be provided with a pop-up screen forcing the voter to confirm his decision to terminate the selection process prior to the selection process actually terminated and the voter selection card being returned.

Referring to FIG. 11, voter-assist terminal 30 provides with screen 143 a confirmation to the voter, in the language previously selected, as to which ballot type he or she is making selections for that will be printed in the future, together with any necessary voting instructions. In this case, the ballot style is indicated as ABC, and the election is identified as the Consolidated Election for Apr. 1, 2003. It should be noted with this screen that the function bar has been expanded to include a BACK designation 148 and a NEXT designation 149. The BACK designation 148 enables the voter to return to the previously displayed screen 142, perhaps to make a different language selection. The NEXT designation 149 enables the viewer to proceed to the next screen after reading the message conveyed by screen by 143. It is anticipated that the NEXT designation will blink after a short time delay to prompt the voter to touch that portion of the function bar 144 to proceed to the next screen and continue his or her candidate selections. The banner strip 150 at the top of screen 143 and subsequent screens remains constant during the election process and may be utilized by the election jurisdiction to present a seal or other identification of the jurisdiction to the voter.

Figure 12A:
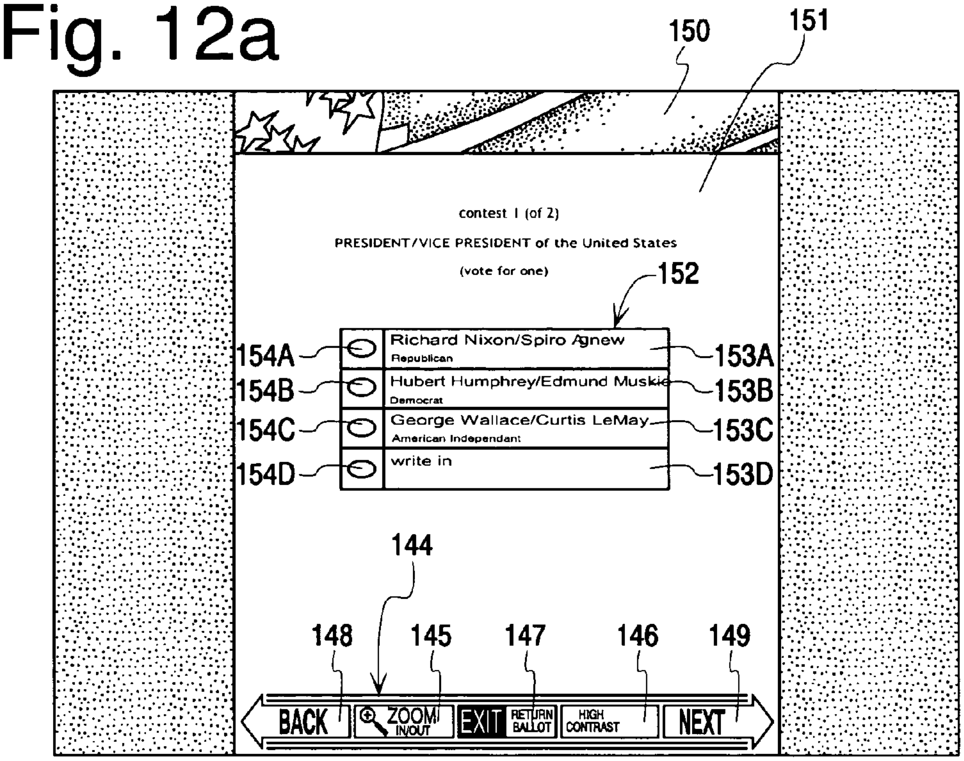
FIG. 12*a* is a depiction of a subsequent display screen showing a contest wherein a single candidate is to be selected.
Figure 12B:
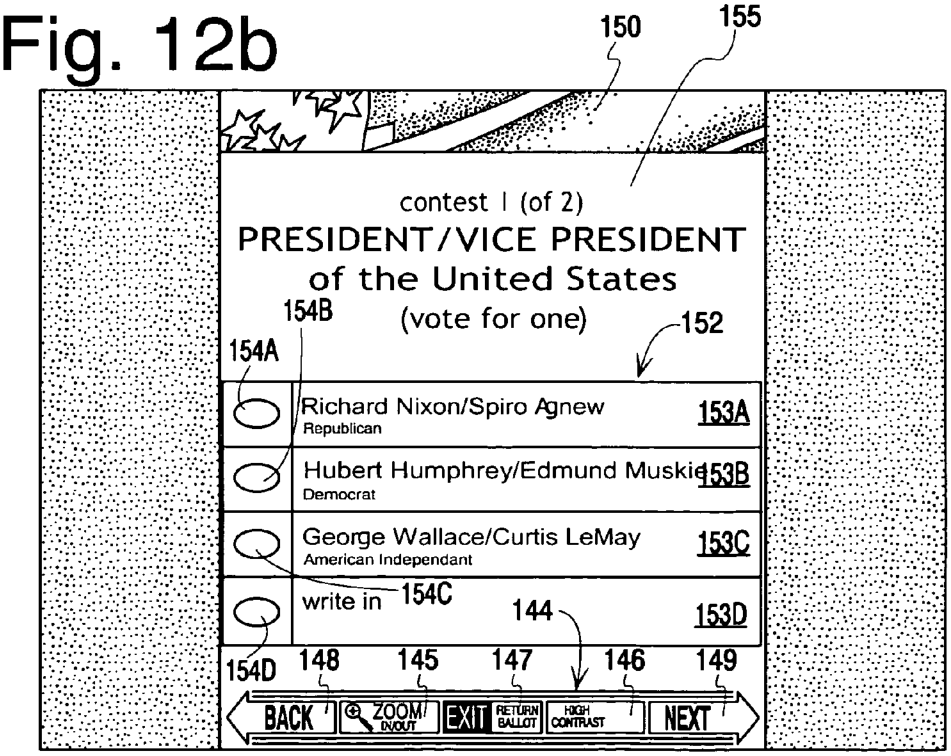
FIG. 12*b* is a depiction of the display screen of FIG. 12*a* following actuation of the zoom function.

Referring now to FIGS. 12*a* and 12*b*, which show screens which might be displayed for an election contest having three named candidates and a single write-in candidate, wherein the voter is allowed to vote for a single candidate. As shown in screen 151, the four possible selections are contained within a box 152, each candidate being within a section 153 of the box and having an associated oval 154 which is darkened or filled in to indicate selection of the candidate. Selections are made on touch screen 141 by touching the section 153 or oval 154 associated with the selected candidate or write-in, which causes that particular section 153 to change color and the associated oval to be changed to black. For example, upon touching the section 153A associated with Richard Nixon/Spiro Agnew, that section turns from white to yellow, and the associated oval 154A changes from white to black. Should another section be subsequently touched, as in making a different selection, it is contemplated that the previously selected candidate will be automatically deselected, the section changing from yellow back to white and the oval changing back to white, and the next selected candidate section 153 changing to yellow and the oval associated with that selected candidate turning to black. In this way the voter can quickly make or change a selection from a particular contest. It is contemplated that only one contest will be provided per display screen. Where a larger number of candidates exist for a particular contest than can be accommodated on a single display screen, then a SCROLL function will be provided consisting of UP or DOWN arrows on either side of box 152 to prompt the voter that additional candidates are available for that contest. In some jurisdictions it may be necessary that a voter scroll through the entire list before having access to the next function 149.

FIG. 12*b* illustrates the ZOOM function. Upon touching the ZOOM icon 145, screen 151 changes to screen 155, making the selection of a candidate easier for a voter having a sight impairment. To return from screen 155 to screen 151, it is only necessary for the voter to touch the ZOOM icon 145 again.

Figure 13:
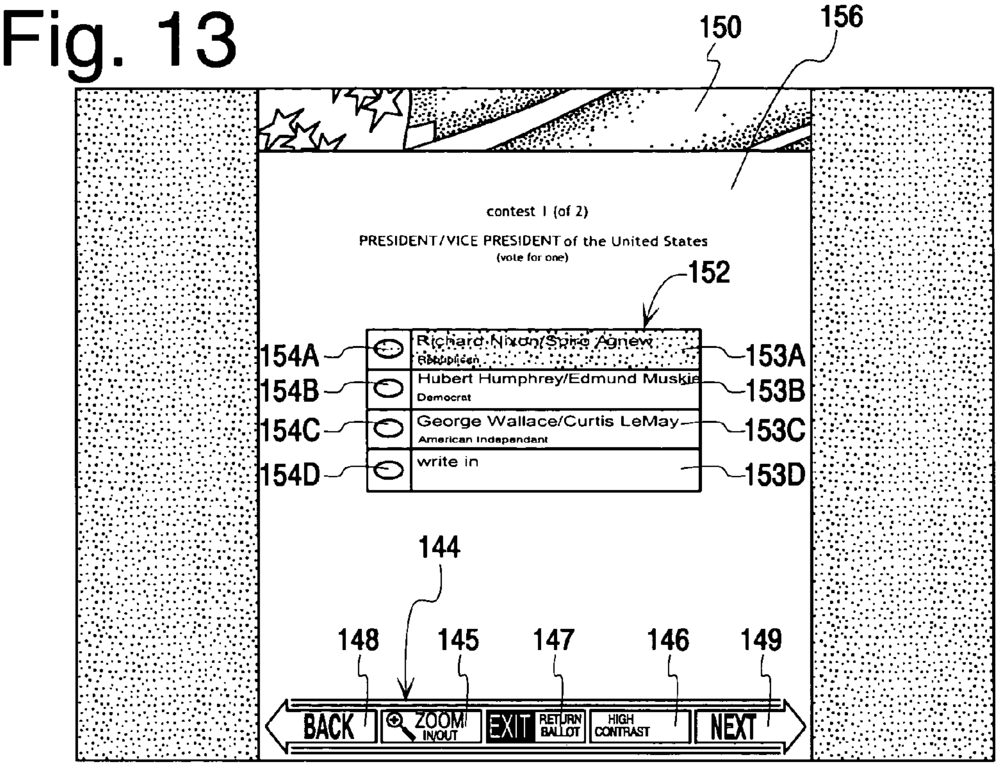
FIG. 13 is a depiction of a subsequent typical display screen showing a contest wherein one of the candidates has been selected by the user.

FIG. 13 illustrates the screen 156 that appears after the voter has touched the section 153 associated with Richard Nixon/Spiro Agnew. As seen, section 153A is highlighted and the oval 154A is marked. It is possible to make the same selections utilizing the navigation keys in user interface key switch panel 33. When using this panel, the UP and DOWN keys 76 and 77, respectively (FIG. 8), allow the voter to scroll through sections 153A-153D, the selected sections 153A-153D being successfully highlighted. To make a selection, it is necessary for the voter to depress the SELECT key 80 for a highlighted section, after which the associated oval 154 is marked and the selection is recognized. The UP and DOWN keys also allow the voter to scroll through the functions of function bar 155, except for the NEXT and BACK functions, which are accessed through BACK and NEXT keys 78 and 79 of user interface panel 33.

It should be noted that when using the "sip and puff" interface provided by the ADA jack 55, the BACK function 148 and NEXT function 149 are scrolled through as well, and the scrolling is closed-loop, since the only functions available to the user are uni-directional scrolling and SELECT.

Figure 14A:
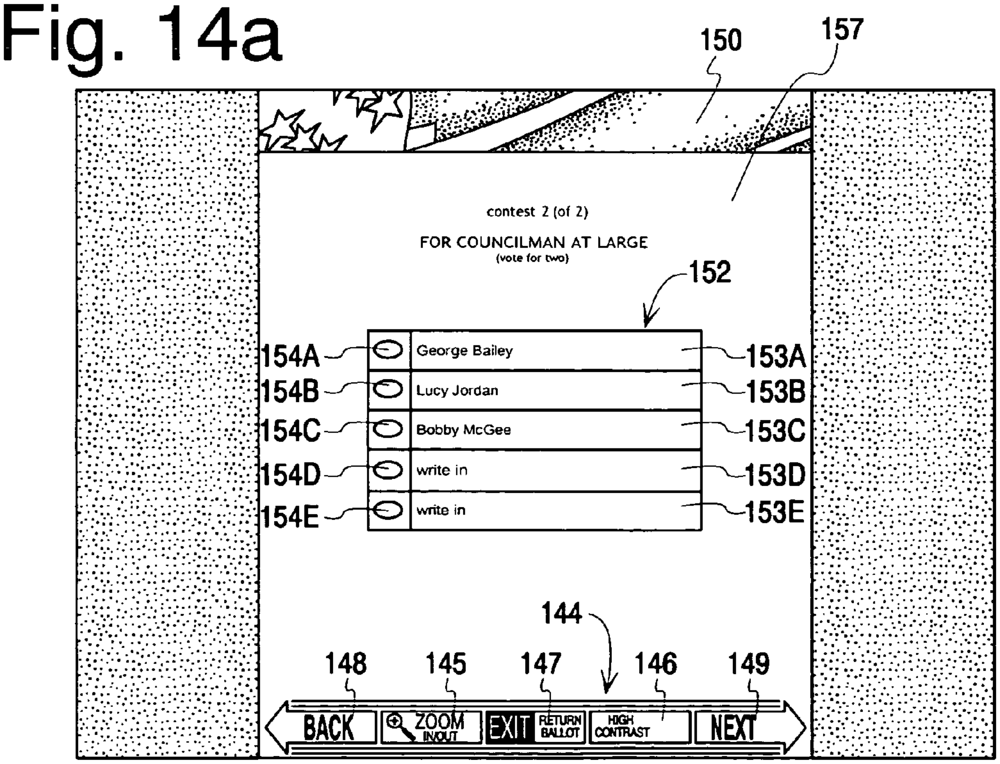
FIG. 14*a* is a depiction of a display screen of a contest wherein two candidates are to be selected.
Figure 14B:
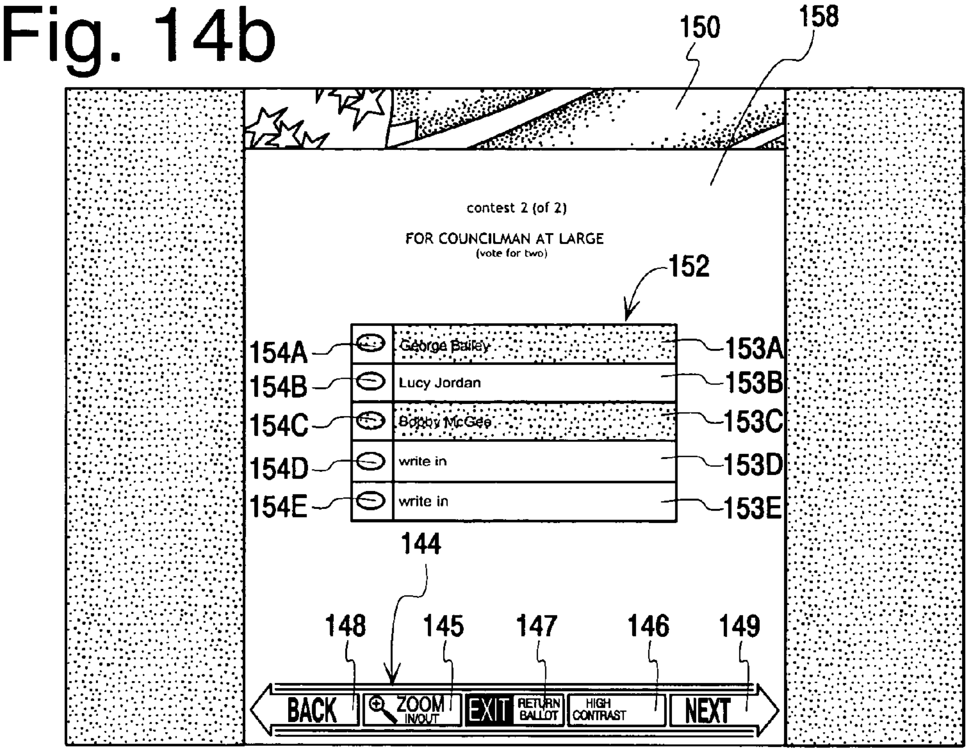
FIG. 14*b* is a depiction of a display screen similar to FIG. 14*a* wherein two candidates have been selected.

Referring to FIGS. 14*a* and 14*b*, a contest where two candidates are to be selected utilizes a screen similar to 156. However, in this case, two selections can be made in the manner previously described for FIG. 13. Should the voter attempt to make a third selection, a prompt will appear in the form of a pop-up instructing the voter that he must first deselect one of the candidates he has previously selected. To deselect a candidate, it is only necessary for the touch screen user to touch one of the previously selected candidates, causing that candidate to be deselected after which he is free to make another selection. For the voter using the voter interface panel 33, it is necessary that he or she first scroll to the candidate to be deselected utilizing the UP and DOWN keys 76 and 77, and then utilize the SELECT key 80 to deselect that candidate. Subsequently, the interface keyboard user can scroll to a newly selected candidate and against depress SELECT key 80 to select that candidate. A voter utilizing the ADA "sip and puff" interface scrolls through the candidate selections and function bar icons in one direction and in a closed loop. The voter continues scrolling through the function selections of function bar 144 until reaching the first candidate on the list, at which time he or she reaches the candidate to be deselected. The "sip and puff" interface is then used to select that candidate for deactivation and the uni-directional scrolling is continued until the newly selected candidate is in position for selection. To move to the next contest, the "sip and puff" interface user then scrolls to the NEXT function icon and actuates select. In the event the voter has made two selections, the screen appears as shown in FIG. 14*b*, the screen 158 showing two candidates highlighted and selected.

Figure 15A:
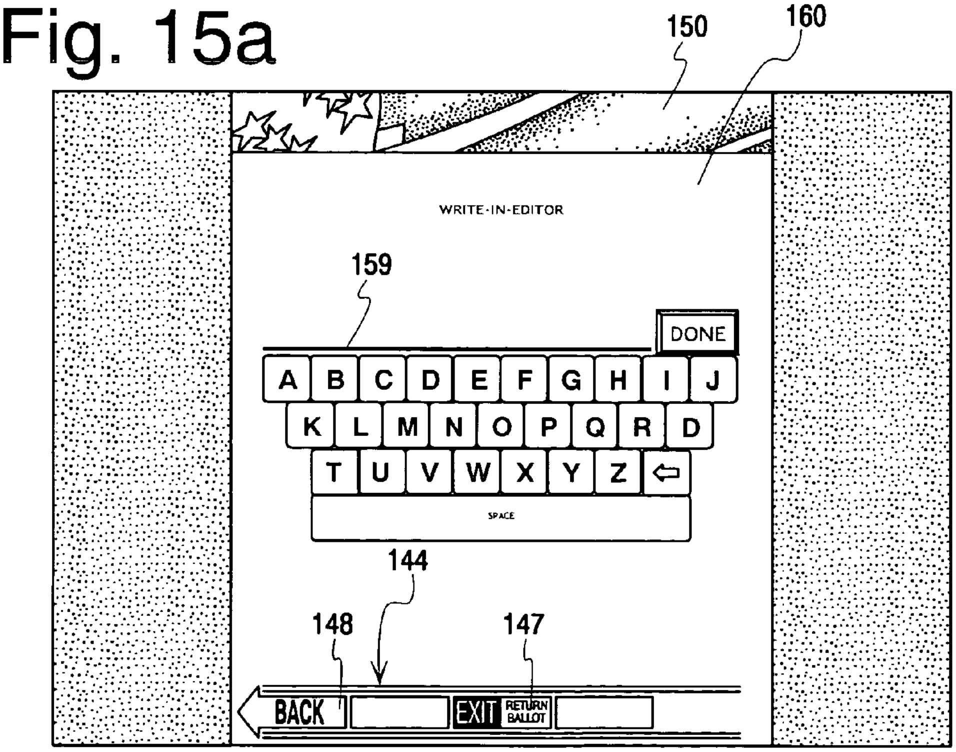
FIG. 15*a* is a depiction of a display screen wherein a pop-up display has appeared to enable selection of a write-in candidate.
Figure 15B:
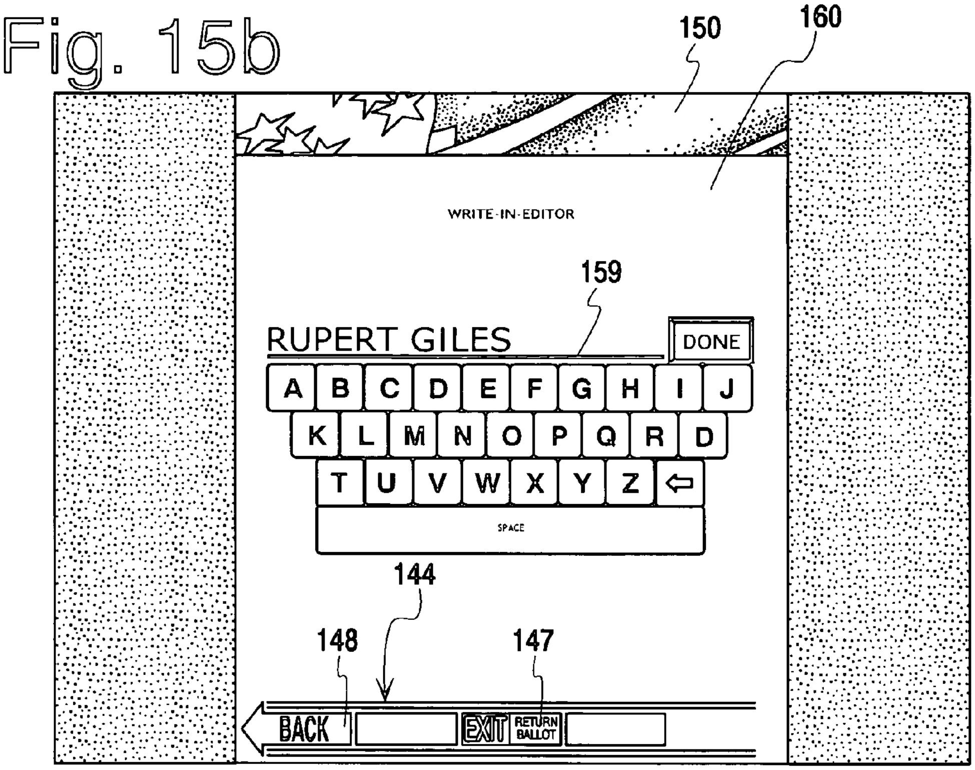
FIG. 15*b* is a depiction of a display screen similar to FIG. 15*a* illustrating the entry of a write-in candidate.
Figure 15C:
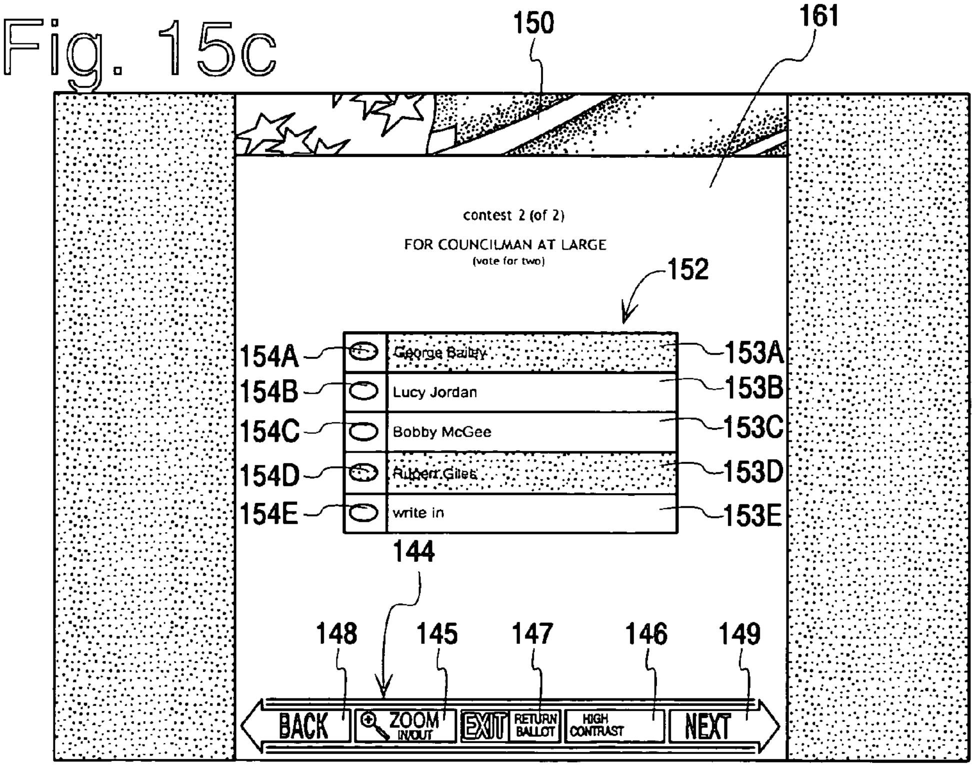
FIG. 15*c* is a depiction of a display screen similar to FIG. 14*b* showing the contest following the entry of a write-in candidate.

Referring to FIGS. 14*b*, 15*a* and 15*b*, to select a write-in candidate, the voter touches a write-in section 153D. With section 153D then highlighted, the associated oval 154D is not marked. For voters using keypad 33, or keypad 65, it is necessary to scroll to write-in section 153D, and then SELECT. After a short time delay, a pop-up display in the form of a keyboard 159 appears as shown by screen 160. The voter next selects the letters of the write-in candidate's name, one letter at a time, until the entire name appears on display 160, as shown in FIG. 15*b*. When the voter has completed typing in the name of the desired write-in candidate, he or she touches the done space, causing the pop-up to disappear after a short delay and the write-in candidate's name to appear in the previously selected write-in section 153D (FIG. 15*c*). The associated oval 154D is preferably marked so that the voter has successfully selected the write-in candidate. The NEXT icon 149 now flashes, prompting the voter to continue to the next contest. It should be noted that, while the write-in process is occurring, the NEXT function is not available. However, the ZOOM, HIGH CONTRAST and EXIT functions remain available, as does the BACK function 148 which allows the voter to abandon the write-in process and return to the contest selections shown on screen 161 in FIG. 15*c*. It should be noted that, once the voter has returned to the contest and both permitted selections have been made, the NEXT icon 149 flashes to prompt the voter to move on to the next contest.

Depending on the jurisdiction, in some instances where the voter attempts to move to the next contest without having made the permitted number of selections, i.e., under-votes, a pop-up screen may appear alerting the user to that fact. It then remains for the user to indicate or confirm on that pop-up display that it is his or her intention to vote for a lesser number of candidates than permitted by the contest. In those situations where such a prompt is used for under-voting, the NEXT icon 149 does not appear until the prompt has been confirmed.

In those situations where the voter has attempted to vote for more than the permitted number of candidates, i.e., over-vote, a pop-up prompt appears notifying the voter of the attempt to over-vote and indicating to him or her that a previously selected candidate must first be deselected before another candidate can be selected. This over-vote prompt may disappear after a short time period allowing the voter to deselect a previously selected candidate or actuate the NEXT icon 149 to move on to the next contest.

Figure 16:
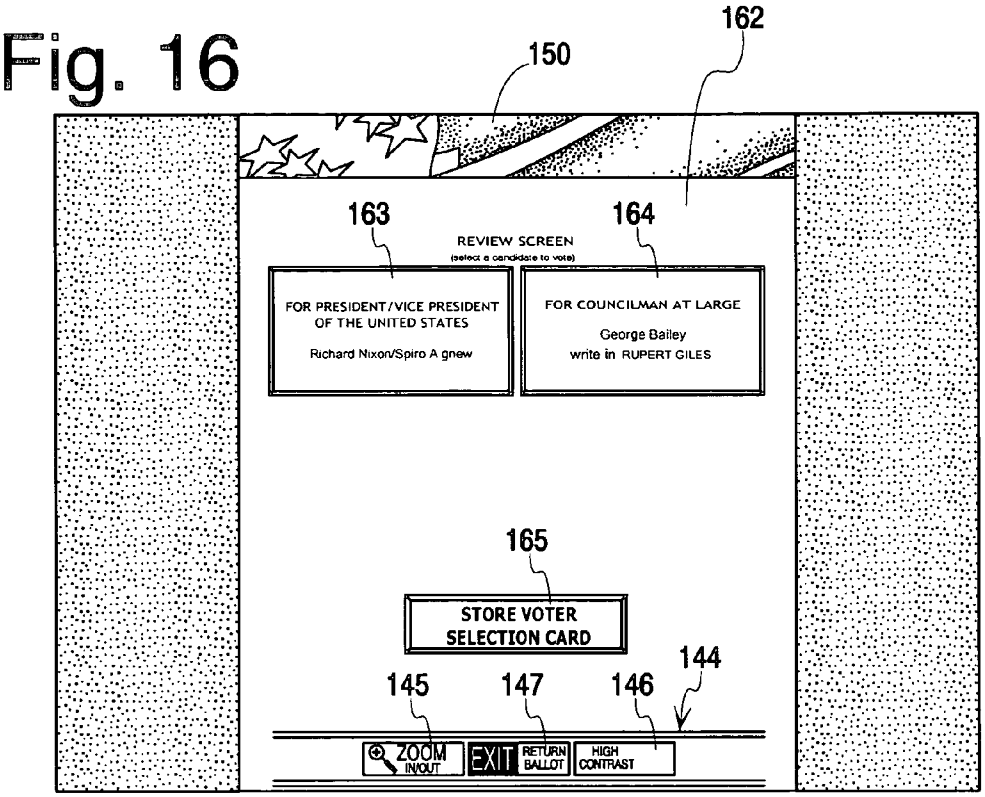
FIG. 16 is a depiction of a typical display screen showing a summary of selections previously made in individual contests of an election.
Figure 17:
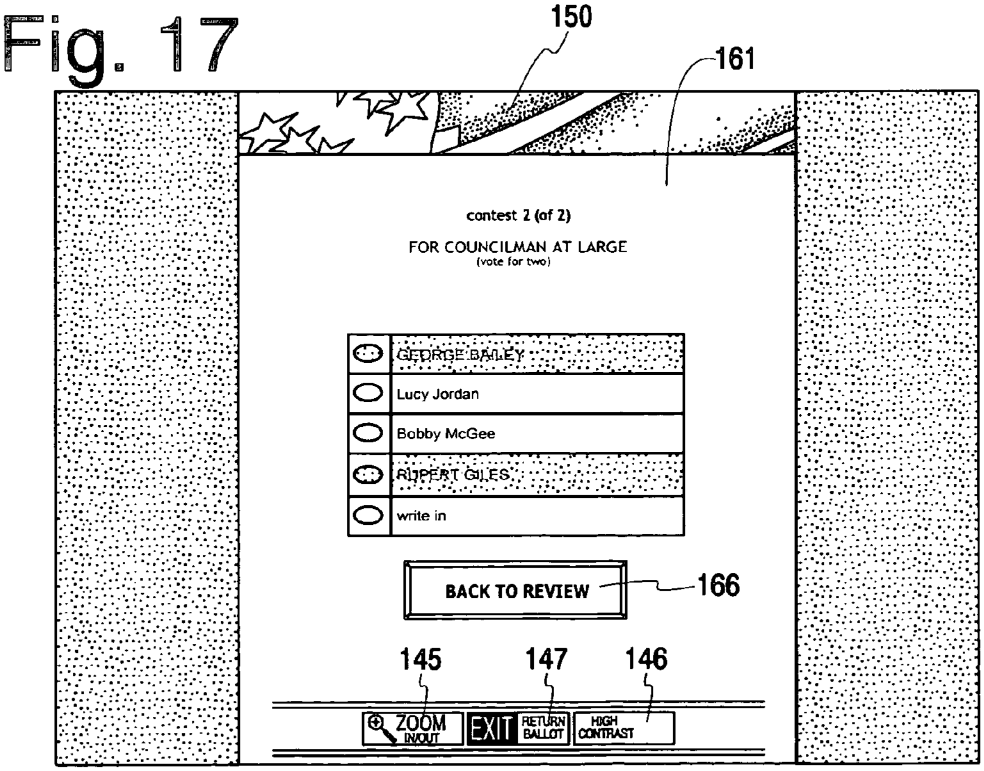
FIG. 17 is a depiction of a typical display screen which occurs following the return to an individual contest from the summary screen of FIG. 16.

After the voter has completed selections in all available contests, the selection process advances to a summary screen 162, as shown in FIG. 16. The summary screen includes a summary box for each contest, the selections for that contest being displayed in the box. Summary box 163 for the contest depicted in FIGS. 12*a* and 12*b* shows the voter's selection for that contest. Summary box 164 for the contest depicted in FIGS. 14*a*, 14*b* and 15*a*-15*c* shows the voter's selections for that contest. The voter can accept his selections for the two contests by touching the STORE VOTER SELECTION CARD function 165 provided in screen 162 of FIG. 16 and his previously inserted voter selection card will be stored with data in accordance with his selections and then returned to him through feed slot 45. Or, when required by the election jurisdiction, the voter can be prompted to advance to a confirmation screen and then prompted to confirm that he wants his voter selection card to be stored in compliance with his selections. It should be noted that in this screen the BACK function 148 and the NEXT function 149 are not available since the voter can only return to his or her previous selection by touching the appropriate summary box. For example, by touching box 164 the voter is returned to screen 161 (FIG. 17) where his or her previously entered selections remain displayed. He or she may then change these selections in the manner previously described or, in the event they are satisfactory to the voter, he or she may touch the BACK TO REVIEW icon 166 to return to the selection summary screen 162. It should be noted that the BACK function 148 and NEXT function 149 are not available on this screen 161 since the only action available to the voter is to return to summary screen 162.

Figure 18:
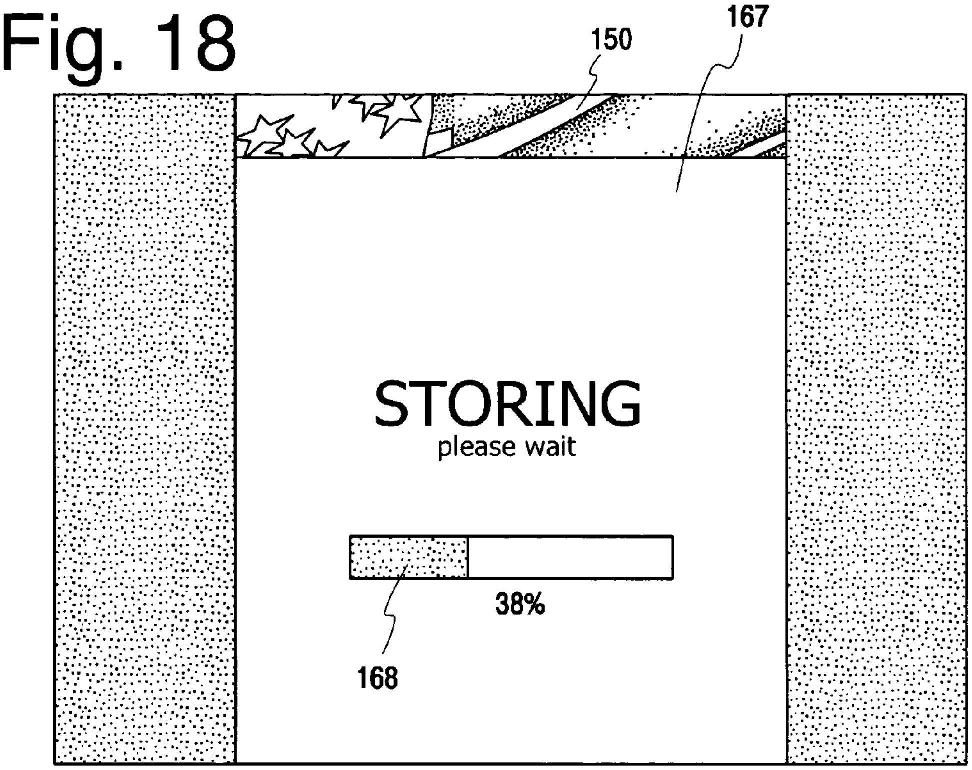
FIG. 18 is a depiction of a typical display screen utilized to provide an indication to a voter that the voter-assist terminal is currently storing his or her selections on the voter selection card.

Once the voter has returned to summary screen 162, he or she may touch STORE VOTER SELECTION CARD icon 165, or confirm on a subsequent page, and the voter selection card will begin to be stored with contest selection data. During the storing process, a screen 167 shown in FIG. 18 is displayed to indicate to the voter that the voter selection card is being stored with the selected data. Preferably, this screen includes a progress bar 168 to indicate the time remaining before the voter selection card is returned to the voter. None of the functions provided by function bar 144 are available on screen 167.

Figure 19:
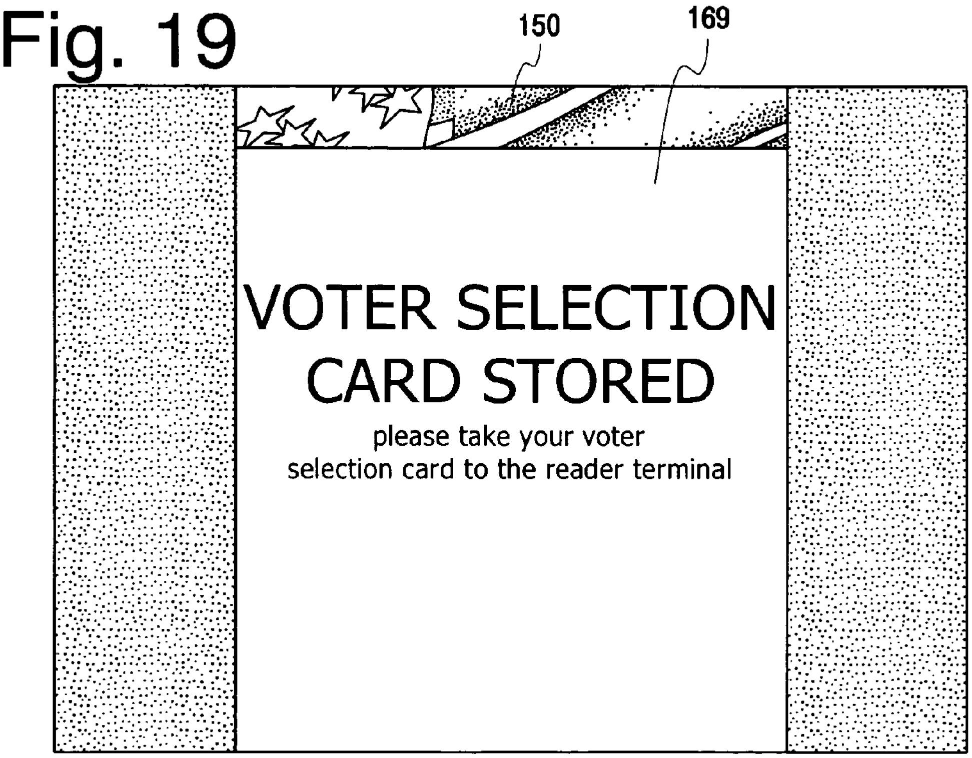
FIG. 19 is a depiction of a typical display screen providing an indication to a voter that the voter selection card has stored the voter's selections and is being returned to the user.

After the voter selection card has been stored, the VOTER SELECTION CARD STORED indication may be provided on a screen 169, as shown in FIG. 19, prompting the voter to remove the voter selection card from slot 45.

It will be appreciated that while a series of screens have been shown which provide for voter selection of candidates on an inserted voter selection card, in practice the composition of the screens may be changed to meet the special requirements of a particular voting jurisdiction. Moreover, additional or alternative functions, including party voting or the random appearance of candidates on a screen for a particular contest, can be readily incorporated in voter-assist terminal 30 by means of conventional programming techniques.

Figure 20A:
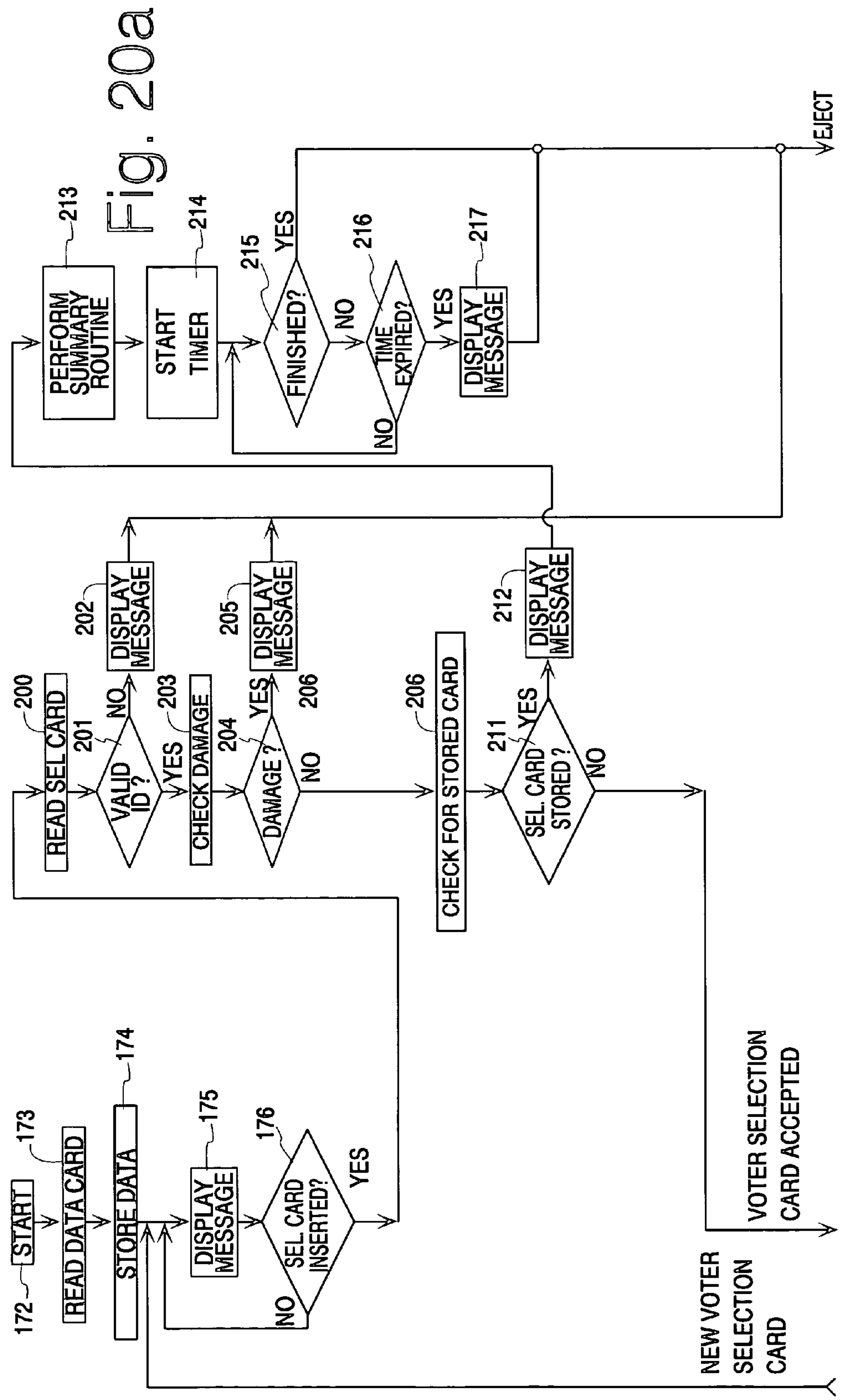
FIGS. 20*a*-20*c* show a simplified functional block diagram of the operation of the principal systems and subsystems of the voter-assist terminal of FIGS. 2 and 3.
Figure 20B:
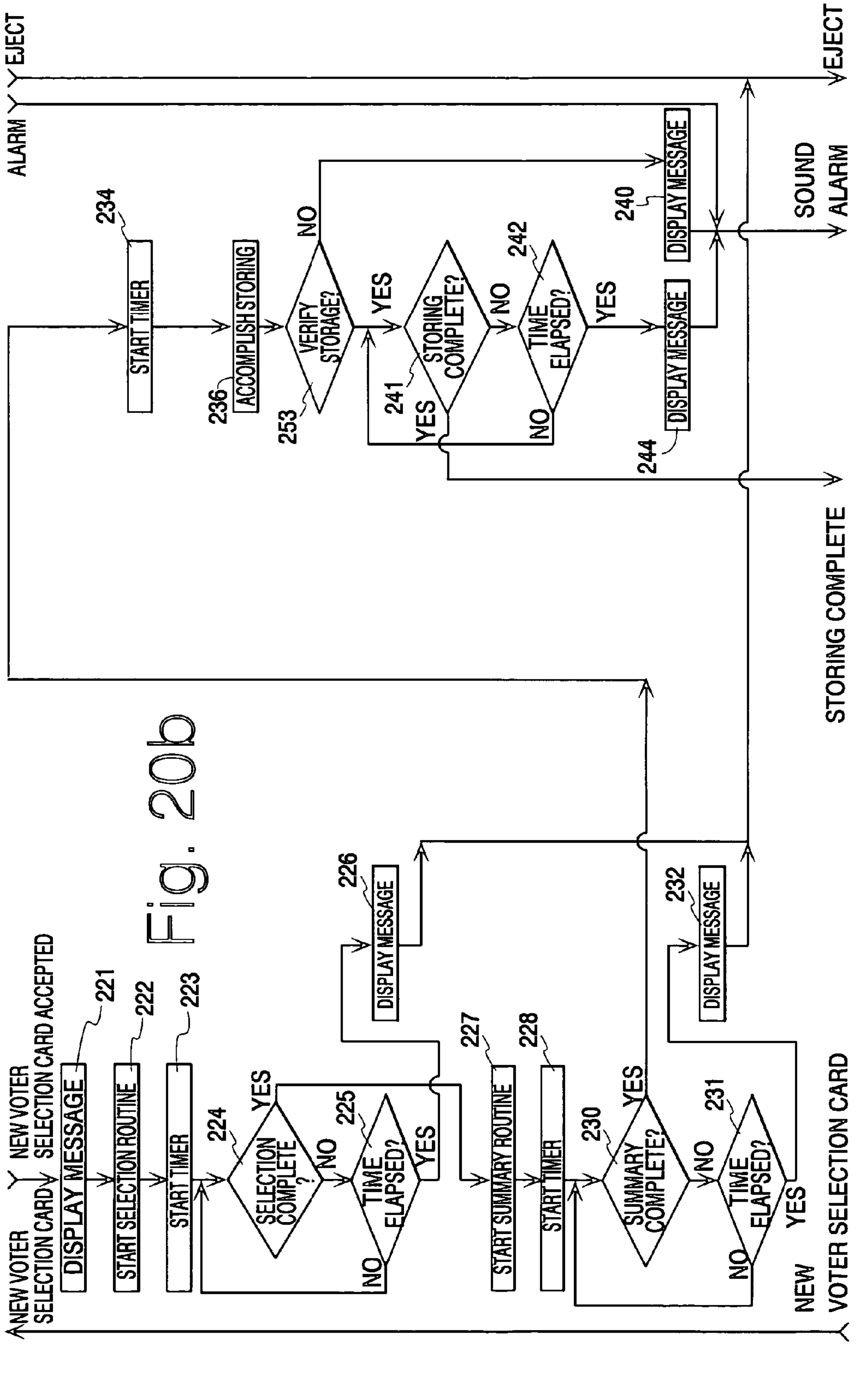
Figure 20C:
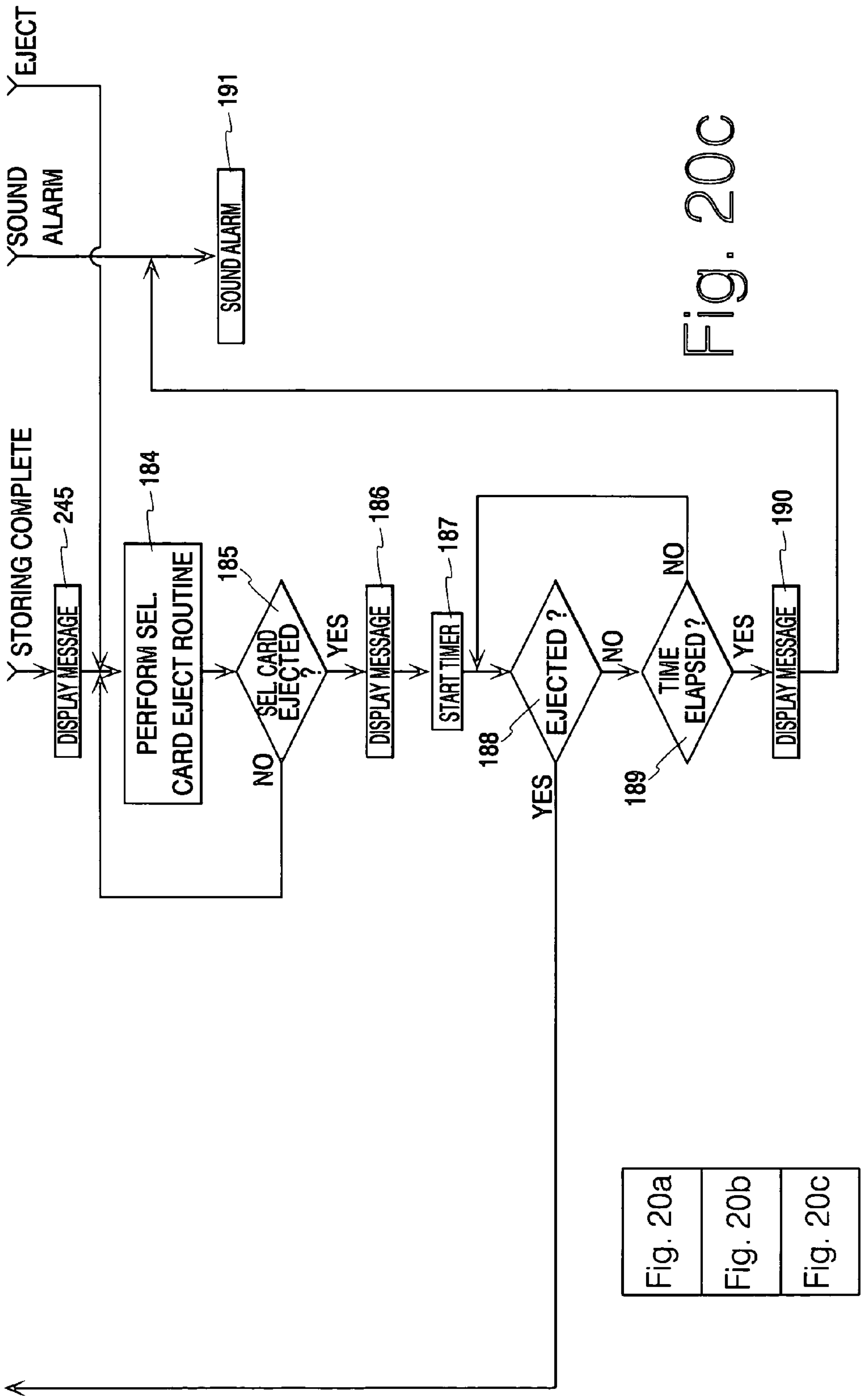

The functioning of voter-assist terminal 30 may be understood by reference to the simplified flowchart shown in FIGS. 20*a*-20*c*. Prior to operation, a pre-programmed compact flash card 170 is installed in a socket 171 (FIG. 7) to provide information on the layout of each ballot style used at a certain jurisdiction. On power-up of the terminal at 172 the compact flash data card is read at 173 and the appropriate ballot information is loaded into RAM within the computer module 138 at 174. The screen 140 depicted in FIG. 9 is now displayed at 175 pending insertion of a voter selection card. Upon insertion of a voter selection card at 176, an encrypted ID is read at 200 to verify that the voter selection card is authentic and may be used in the voter-assist terminal at 201. If the ID is invalid, a message is displayed to this effect at 202 and the voter selection card is ejected from the terminal at 184. When ejection of the voter selection card is detected at 185, a message is displayed at 186 on the LCD display screen 141 to instruct the voter to remove the voter selection card.

At the same time, a timer function is started at 187 and, in the event that the voter selection card has not been removed by the voter at 188 and the time has elapsed at 189, a further message is displayed at 190 and an alarm is sounded at 191. In the event the voter selection card has been removed at 188, the message displayed at 175 reappears, and the voter-assist terminal 30 is available to process another voter selection card.

If the voter selection card is found to contain a valid ID at 201, then the voter selection card is electronically checked for internal damage at 203. For example, test data bits may be stored and read to make sure the voter selection card is responsive to commands by terminal 30. If the voter selection card is determined to be damaged at 204, then a message is displayed to this effect at 205 and the voter selection card is ejected from the terminal at 184 as previously mentioned.

If the voter selection card is found to not be damaged at 204, then the voter selection card is checked for selections having been already stored at 206. If the ballot is found to be already stored with data at 211, then a message is displayed to this effect at 212 and the voter-assist terminal 30 reverts to a summary routine 213. During this summary routine, stored data on the voter selection card is read and the corresponding selections are displayed to the voter on a screen similar to screen 162 depicted in FIG. 16, with the exception that the STORE VOTER SELECTION CARD function 165 is not provided and instead a RETURN VOTER SELECTION CARD function (not shown) is displayed instead. At the same time, a timer is started at 214. When the voter has confirmed the summary at 215, the voter selection card is ejected at 184 in the manner previously described. In the event the voter has not requested return of the voter selection card at 215 and the time allotted for his review of the summary has expired at 216, a message is displayed at 217 and the voter selection card is ejected at 184 as previously described.

In the event that the voter selection card is determined to not be stored at 211, a message is displayed at 221 (FIG. 20*b*) and the voter selection routine is begun at 222. At the same time, a timer is started at 223. If the voter has not completed the selection process at 224, and the time allotted for his selections has elapsed at 225, then a message is displayed at 226 informing the voter of the time having elapsed, and the voter selection card is ejected at 184 in the manner previously described.

In the event that the voter has completed selecting candidates from the contests presented to him at 224, then the selection summary routine is initiated at 227. At the same time, a timer is started at 228. If the summary has not been accepted by the voter at 230, and the time allocated for the voter reviewing the summary has elapsed at 231, then a message is displayed at 232 advising the voter that his or her review time has elapsed and the voter selection card is ejected from the terminal at 184 in the manner previously described. In the event the voter has approved the summary at 230, then a timer is started at 234 and contest selection data begins to be stored on the voter selection card at 236. In the event an error is detected in the storing process at 238, a message is displayed at 240 advising the voter and election officials that a storing error has occurred. At the same time, an alarm is sounded at 191 to alert officials to the malfunction. In the event the storing process is verified at 238, but storing has not been completed at 241, and the time allocated for the voter selection card to be stored has elapsed at 242, a message is displayed at 244 advising the voter of a terminal malfunction. An alarm is also sounded at 191 to alert election officials. In the event the storing process has been completed at 241, then a message is displayed at 245 (FIG. 20*c*) and the voter selection card ejection routine 184 is performed in the manner previously described.

Thus, as shown in FIGS. 20*a*-20*c*, voter-assist terminal 30 functions to receive a voter selection card, by reference to data stored on a compact flash data card installed in the terminal, to present a series of screens or audio prompts to a voter to enable the voter to make selections which are presented in summary form to the voter, and if approved, appropriately stored on the voter selection card which is then returned to the voter. No record of the voter's selections is maintained in the terminal 30.

Figure 21A:
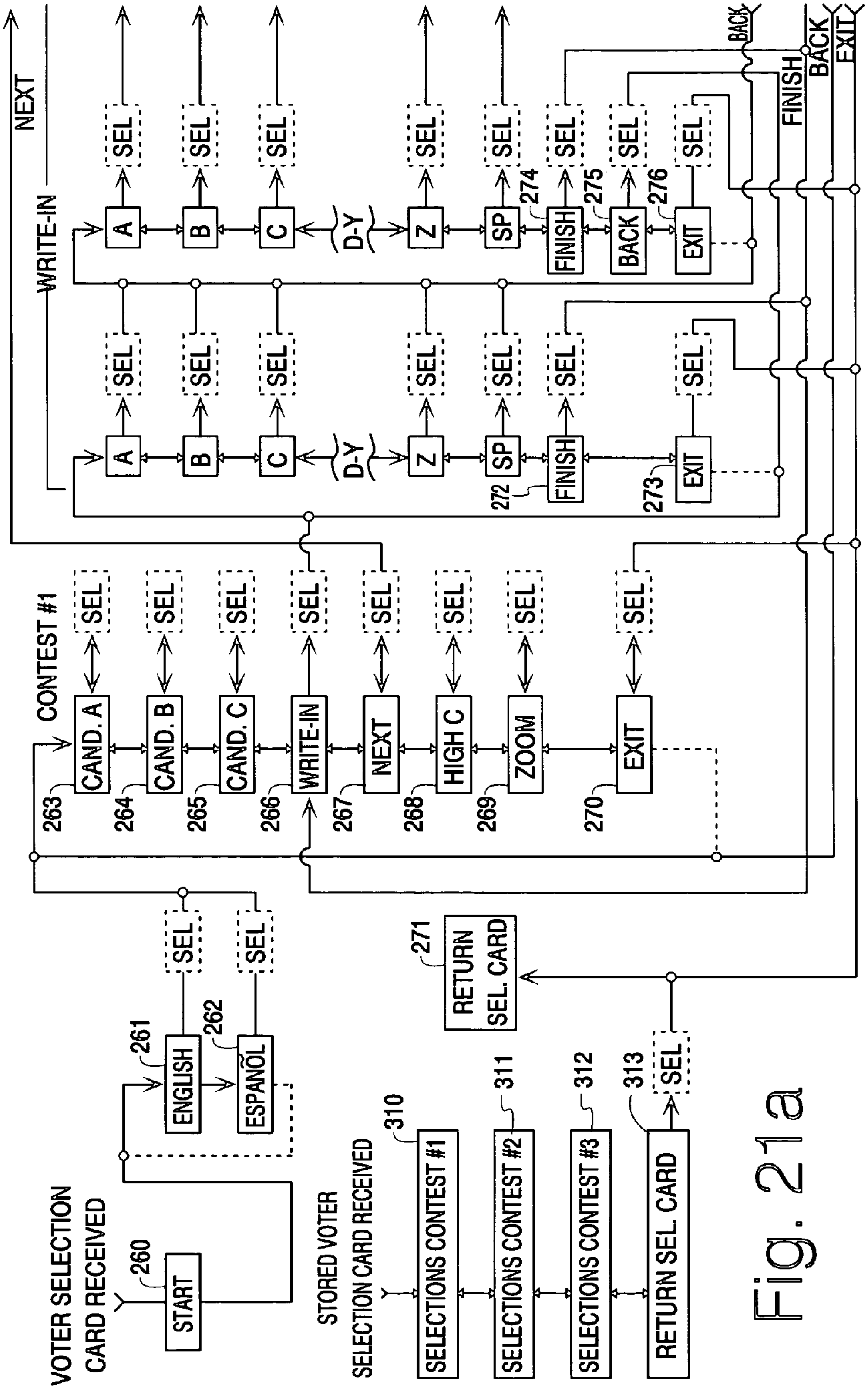
FIGS. 21*a*-21*c* show a simplified flowchart of the steps taken by the voter in utilizing visual and aural prompts provided by the voter-assist terminal to make selections from the contests.
Figure 21B:
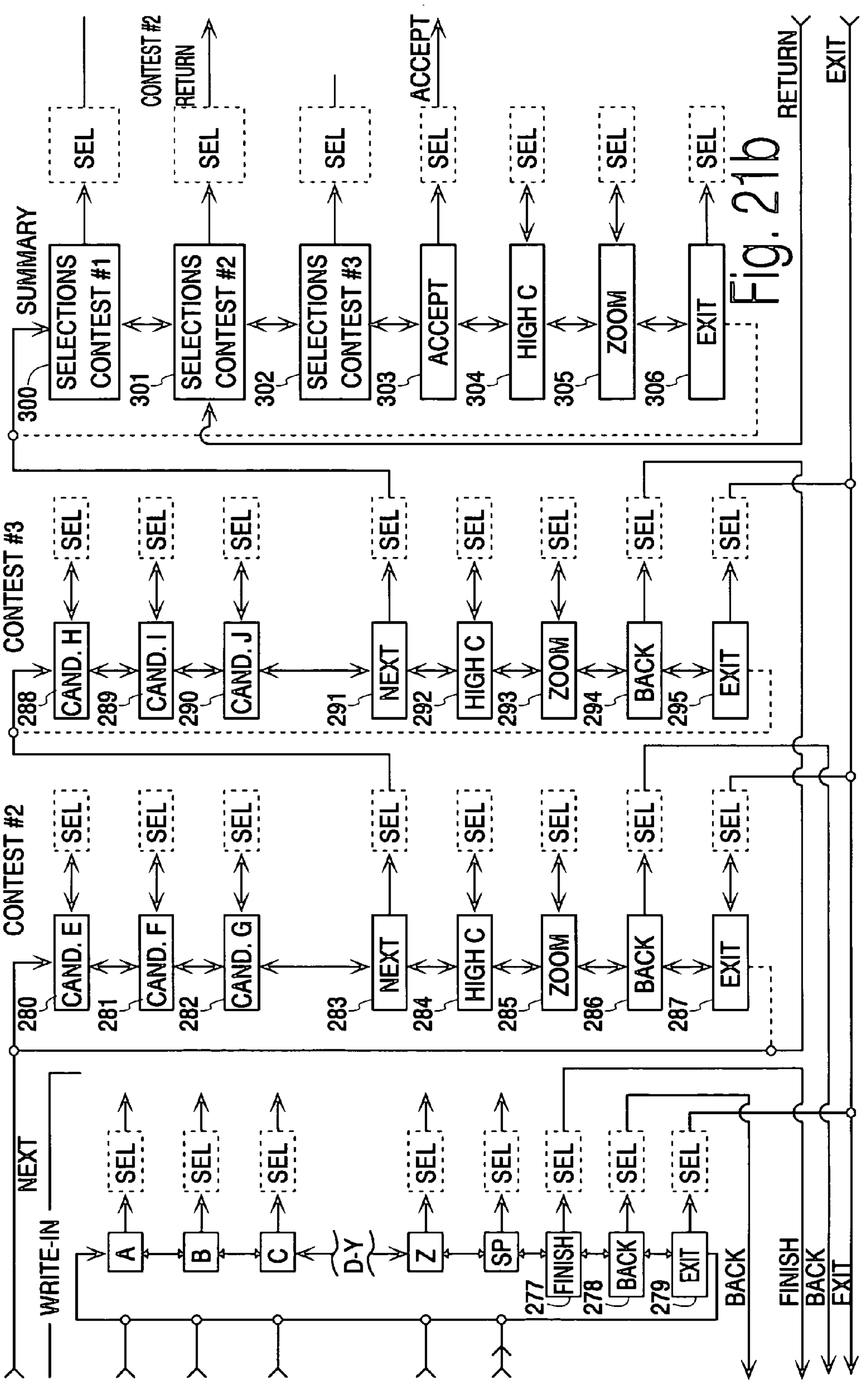
Figure 21C:
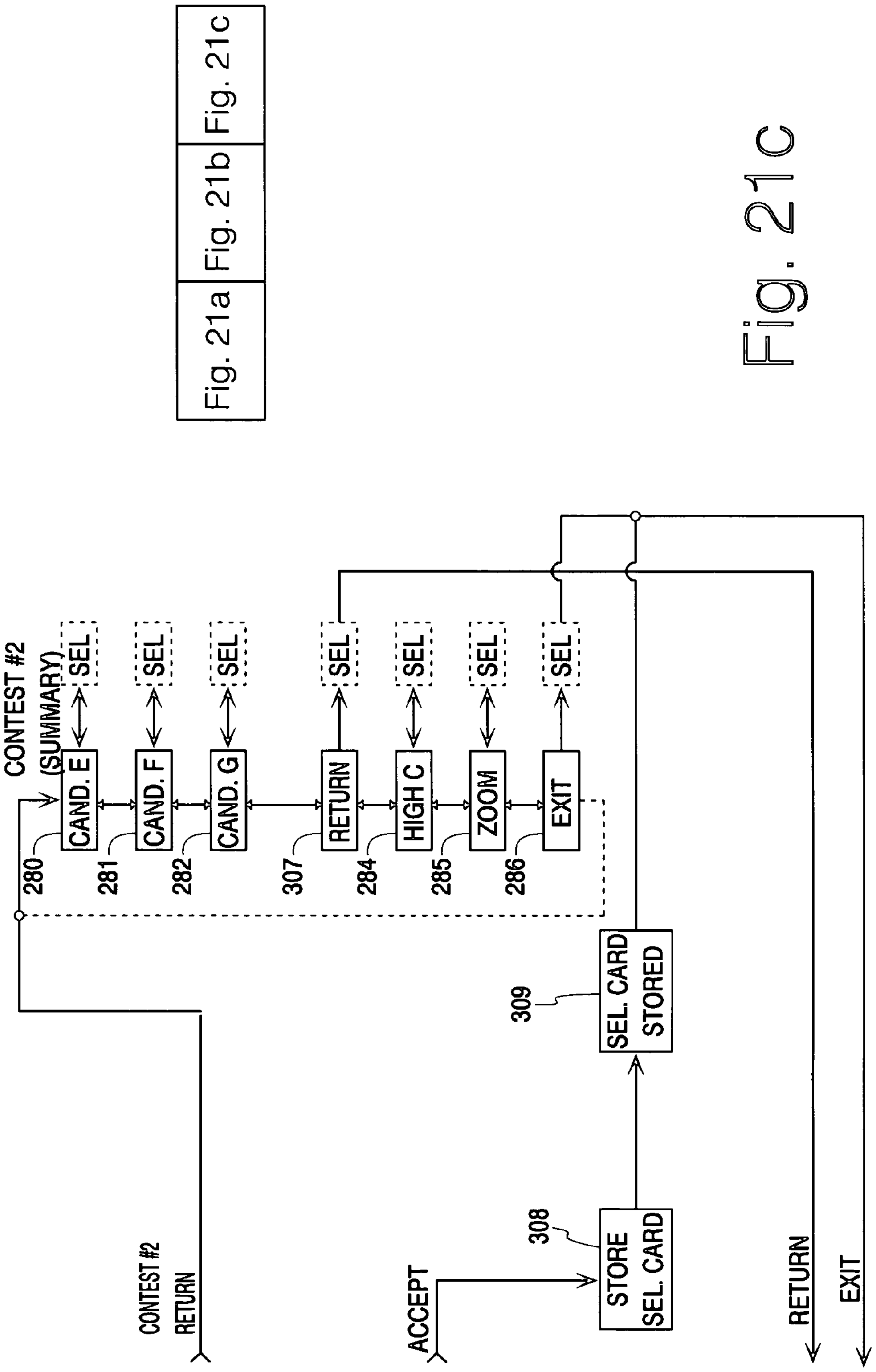

Referring to FIGS. 21*a*-21*c*, the voter-assist terminal 30 provides interfaces by which a voter can make selections on a voter selection card using either a touch screen visual interface, and audio keyboard interface or a two-contact audio or video "sip and puff" ADA interface. The three interfaces work in a coordinated manner to allow selections to be stored in the most efficient manner possible by the voter. In particular, with reference to FIGS. 21*a*-21*c*, after voter selection card is received, an initial message is displayed at 260, and the terminal automatically progresses to a language selection screen such as that shown in FIG. 10. The voter now selects between languages, in this case, English or Spanish. Using the touch screen, it is only necessary to touch the English selection and the selection is acknowledged, and the terminal proceeds, with the possible exception of intervening instruction pages, to the first contest. When the voter is making his or her selections by means of a voter interface keypad 33, the voter scrolls through the language selections, which are highlighted if the screen is activated, or which are only audio prompts if the screen is blank, until the desired language has been highlighted or the desired audio prompt has been spoken, at which time the voter depresses the select key 80 (FIG. 8) and the selection is recognized. Subsequent instruction pages, if any, are presented in the selected language and contest number one is made available to the voter. The SEL functions are contained within broken lines to indicate that they are only required in the event the keypad is utilized or the "sip and puff" interface is in use. In the case of the "sip and puff" interface, the voter scrolls through the selections, in this case, English and Spanish, until the desired selection occurs. Scrolling is done in one direction only so that after the last selection has been scrolled to, the next scroll command brings the voter back to the first selection. This closed-loop scrolling is shown in dotted lines where applicable.

The same logic applies to contest number one. Using the touch screen, the voter may directly select any one of the four candidates 263-266, the NEXT function 267, the HIGH CONTRAST function 268, the ZOOM function 269 or the EXIT function 270. As previously described, where the candidate's name is touched on the touch screen, the candidate's name is framed in color and the associated oval is marked. Where a write-in candidate is selected, the screen reverts to a write-in screen wherein the letters A through Y may be scrolled through as well as a space, finish and delete function. When the NEXT function is selected, the screen displays contest number two. When the HIGH CONTRAST function is selected, the screen reverts to a monochrome high contrast image until the high contrast function is actuated a second time. Similarly, when the ZOOM icon is selected, the display is enlarged until the ZOOM function is actuated again. When the EXIT function is selected, a confirmation screen typically pops up and, if exit is confirmed, the voter selection card is returned at 271 to the voter.

When selections are made in contest number one using the navigation keys, the voter scrolls up or down through selections 263-270 using the arrow-shaped UP and DOWN keys 76 and 77. The candidates and functions thus selected by keypad scanning are highlighted as they are scanned, but are not selected. To select the candidate or function, it is necessary to depress the SELECT key 80. If the display has been blanked by actuation of the SCREEN blank key 81, then the high contrast and zoom functions are skipped in the scanning process and the voter relies on synthesized speech to identify each selection as he scrolls through the list of possible selections. Since the keypad allows the voter to scroll up or down, the selection process is not closed-loop. In the audio mode, when exit is selected, the confirmation audio prompt will follow which must be confirmed before the selection process will be terminated and the voter selection card returned.

When a voter is making a selection in contest number one utilizing the "sip and puff" ADA interface, scrolling takes place in one direction only. Provided the screen is not blanked, all options 263 through 270 are presented, and following the exit option at 270, the loop is closed to provide candidate A option at 263.

When using voter interface panel 33, the voter may actuate the arrow-shaped NEXT key 79 at any time to proceed directly to the next contest. The BACK function is not available to the voter in contest number one since this is the first contest in the series of contests to be presented to the voter. In the event a voter utilizing the keypad interface 33 actuates the NEXT key 79 prior to making a selection, a visual and/or audio prompt, as appropriate, may be presented and require confirmation to prevent inadvertent under-voting prior to proceeding to the next contest. Likewise, attempts at over-voting are similarly followed by a visual or audio prompt, or both, to enable the voter to remedy the attempted over-vote.

A similar logic applies to the selection of a write-in candidate. When the write-in option 266 is selected, the voter proceeds through the alphabet A-Z, space, finish, and delete. Using the touch screen, the voter need only touch the pop-up keyboard to enter the letters of the write-in candidate. When using the keypad interface 33, the voter scrolls up and down, observing visual and/or audio prompts to make a selection using the select key 80. Using the "sip and puff" ADA interface, scrolling is done in one direction only so that, after the delete function, the next opportunity presented for selection is the A character. As previously described, when the finish function is selected, the display reverts to the location of the write-in candidate and subsequent scrolling within contest number one takes place from there. Movement to the next letter in the candidate's name takes place automatically with the selection of either a letter or space. Selection of the finish function 272 returns the terminal to contest number one and selection of the exit function 273, after confirmation of a subsequent pop-up confirmation display, terminates the selection process and causes the voter selection card to be returned to the voter at 271.

Selection of the second letter of the write-in candidate's name is accomplished in the same manner as selection of the first character. The functions finish 274, back 275, and exit 276 appear in the scrolling cycle. As before, data entry is direct utilizing the touch screen keyboard and indirect, requiring actuation of the select key 80 utilizing the keypad voter interface and either video or audio prompts, using the keypad or ADA interfaces. As before, in the case of the "sip and puff" interface, the uni-directional scrolling requires that the exit function be followed by a return to the letter A. The back function 275 is available when selecting the second letter since a previous letter has been selected and may require change.

The third letter of the write-in candidate's name is selected in the same manner as the second letter, with finish function 277 (FIG. 21*b*), the back function 278 and a exit function 279 being included in the scrolling process.

After selection of a candidate in contest number one, a selection is made available in contest number two. Three candidates, 280-282, are available for selection, as well as NEXT function 283, HIGH CONTRAST function 284, ZOOM function 285, BACK function 286 and EXIT function 287. These functions are accessed in the manner previously described in connection with contest number one. BACK function 286 is available since a previous contest is now available to return to. Upon selection of the NEXT function 283, either by direct entry on touch screen 141 by scrolling action with keypad 33 and select key 80 or through use of the "sip and puff" ADA interface, the selection process proceeds to contest number three. This contest provides three candidates 288-290, a NEXT function 291, a HIGH CONTRAST function 292, a ZOOM function 293, a BACK function 294 and an EXIT function 295. Access to these functions is provided in the same manner as access to the functions in contest number two.

Upon actuation of the NEXT function 291 in contest number three, the selection process progresses to a summary screen wherein the selections previously made in contests one, two and three are displayed to the voter. The voter can directly select on touch screen 141, or by means of keypad interface 33, scroll through the various contest summaries 300-301, and ACCEPT function 303, a HIGH CONTRAST function 304, a ZOOM function 305 and an EXIT function 306. Should the voter wish to change his or her selection in a particular contest as, for example, contest number two, the voter selects this contest, either directly on touch screen 141 or through scrolling action by means of keypad interface 33 or "sip and puff" ADA interface 55 to cause the terminal to return to the contest so that the voter can makes changes if desired. In this case, the summary process directs the terminal to contest number two (FIG. 21*c*) wherein three candidates 280-282 are presented for selection along with a RETURN function 307, a HIGH CONTRAST function 284, a ZOOM function 285 and an EXIT function 286. Selection within this contest is now done in the same manner as the previous selection, except that the NEXT function 283 is replaced with a RETURN function 307 which returns the voter to the summary page. The NEXT function 283 and the BACK function 286 of contest number two do not appear as the voter is required to return to the summary page after making any necessary changes. Actuation of the EXIT function and subsequent confirmation causes the selection process to be terminated, and the voter selection card to be returned to the voter at 271. Execution of the RETURN function 307 causes a return to the summary page with the contest number two selections 301 highlighted but not selected.

Actuation of the ACCEPT function 303 within the summary page causes the voter selection card to be stored at 308 and a message to be conveyed to the voter at 309 that the voter selection card has been stored and is being returned at 271. Alternatively, a confirmation page may be represented wherein the voter is requested to confirm his or her decision to store selected data on the voter selection card prior to the voter selection card being stored by terminal 30.

In the event that a stored voter selection card is received by voter-assist terminal 30, the terminal reverts to a summary mode wherein results of contest number one are displayed at 310, the results of contest number two are displayed at 311 (FIG. 21*a*) and the results of contest number three are displayed at 312. No other functions are available except RETURN VOTER SELECTION CARD at 313, which, if properly selected, causes the voter selection card to be returned at 271 in the same condition as received. Alternatively, additional functions could be added in the event a stored voter selection card is received, including returning to selected one of the three contests to provide a review of all of the candidates present in the selected contest, and to provide high contrast and zoom functions otherwise unavailable on the summary page.

Thus, voter-assist terminal 30 employs a voter interface scheme that allows efficient candidate selecting utilizing touch screen 141, keypad 33 or a two-contact "sip and puff" connection at ADA port 54.

Figure 22:
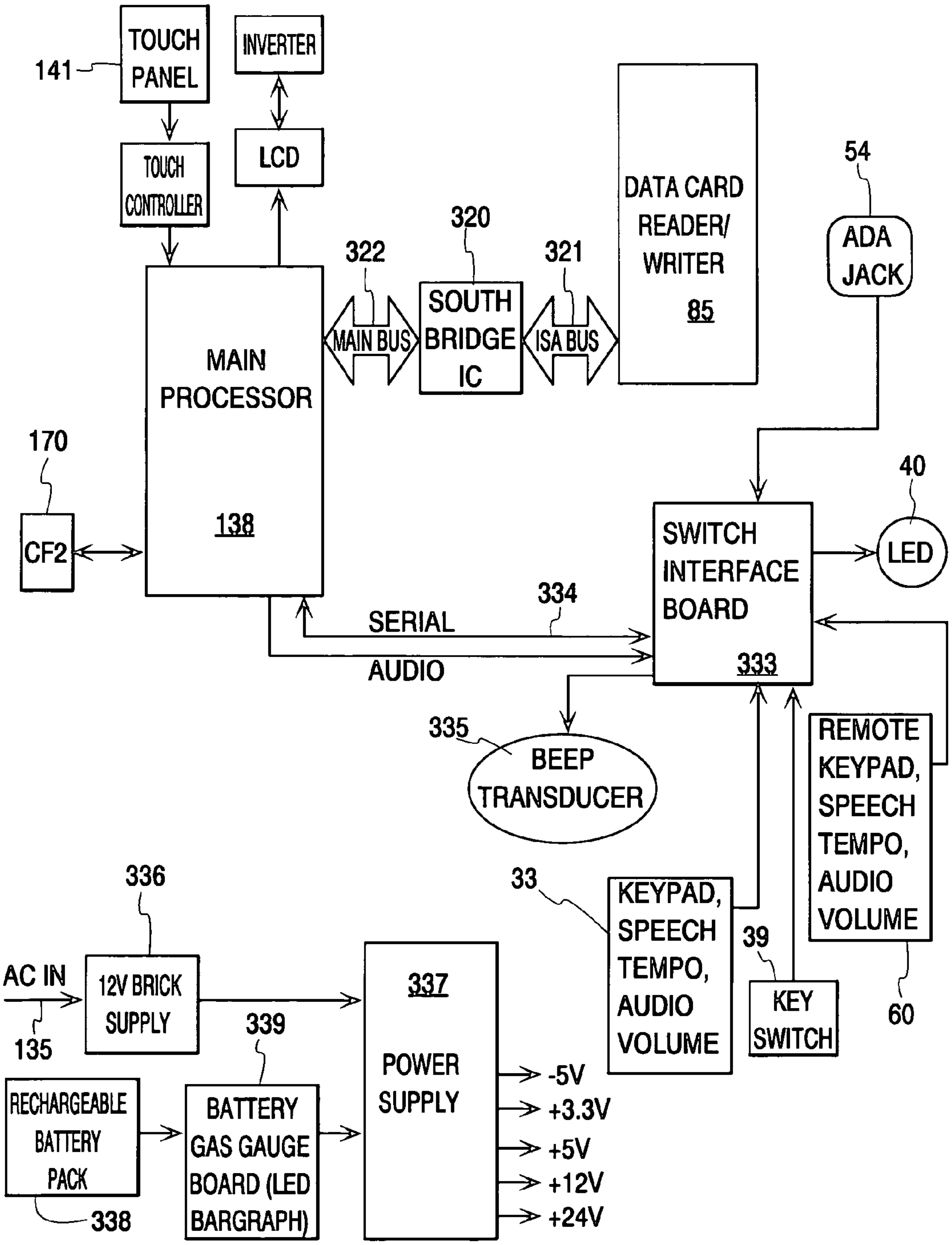
FIG. 22 is a simplified block diagram showing the principal circuits and components of the voter-assist terminal of FIGS. 2 and 3.

Referring to FIG. 22, the various functions of voter-assist terminal 30 are controlled by a main processor 138 and a data card reader/writer 85. Processor 138 communicates with a south bridge IC 320 by means of a main bus 322, and the south bridge IC 320 communicates with the data card reader/writer 85 by means of an ISA bus 321. Processor 138 communicates with a switch interface board 333 by means of a serial I/O interface 334 and a parallel audio connection. Switch interface board 333 provides signals to the power supply/battery status LED 40, an optional beep key actuation transducer 335, keypad 33 and the remote keypad module 60. Key switch 39 also provides input to board 333. Power supplied to terminal 30 in a conventional manner, a 12-volt brick supply 336 providing power to a switching power supply 337 which generates the necessary voltages for operation of the various circuits of the terminal. A rechargeable battery pack 338 accessible through access door 132 provides power to the switching power supply 337. A battery gas gauge board 339 provides LED bar graph display (not shown) on the rear panel of the terminal to provide an indication of battery condition when the terminal is in storage.

Figure 23:
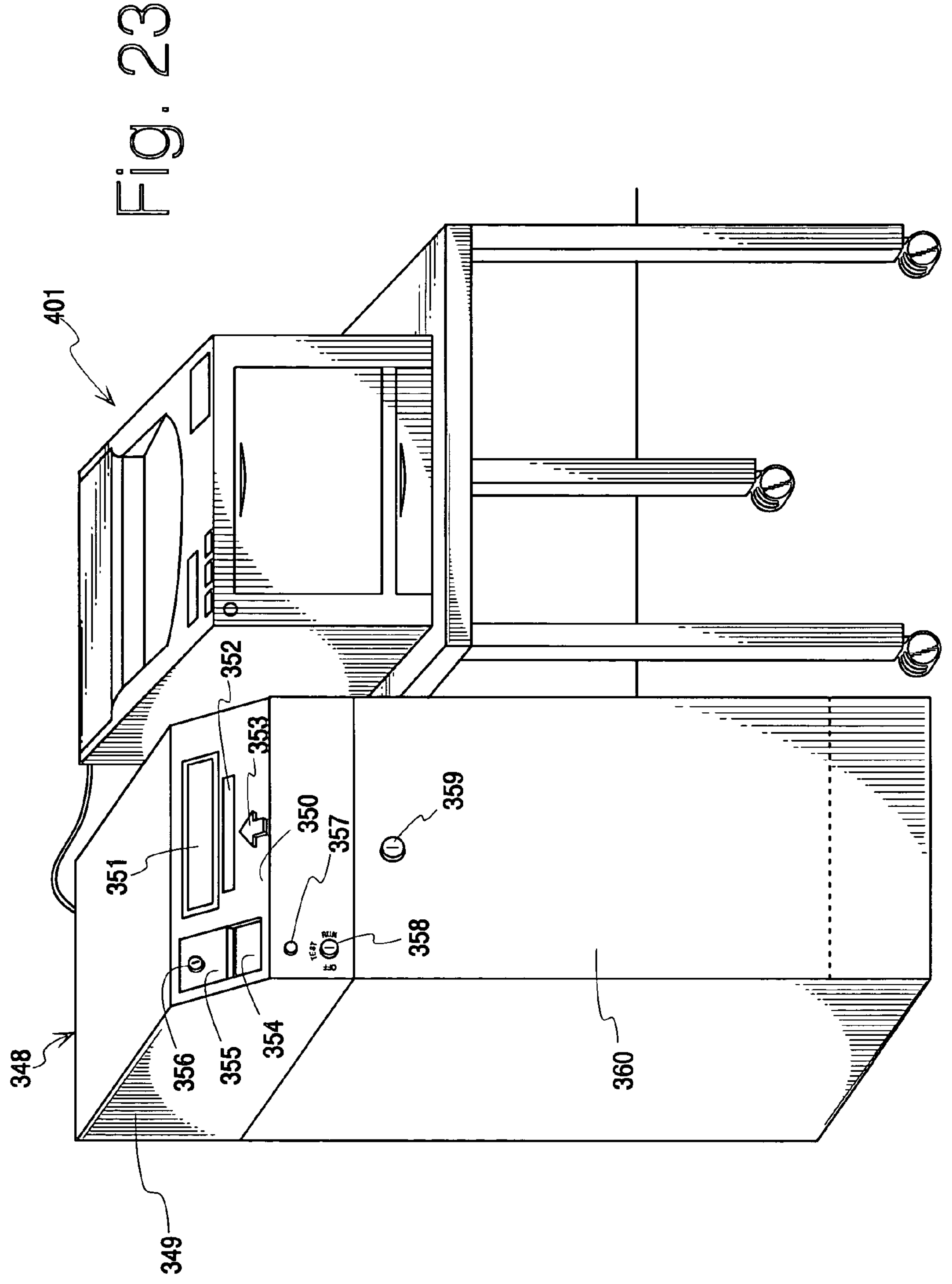
FIG. 23 is a perspective view of the reader terminal next to an attached standard two-sided printer constructed in accordance with the invention.
Figure 24:
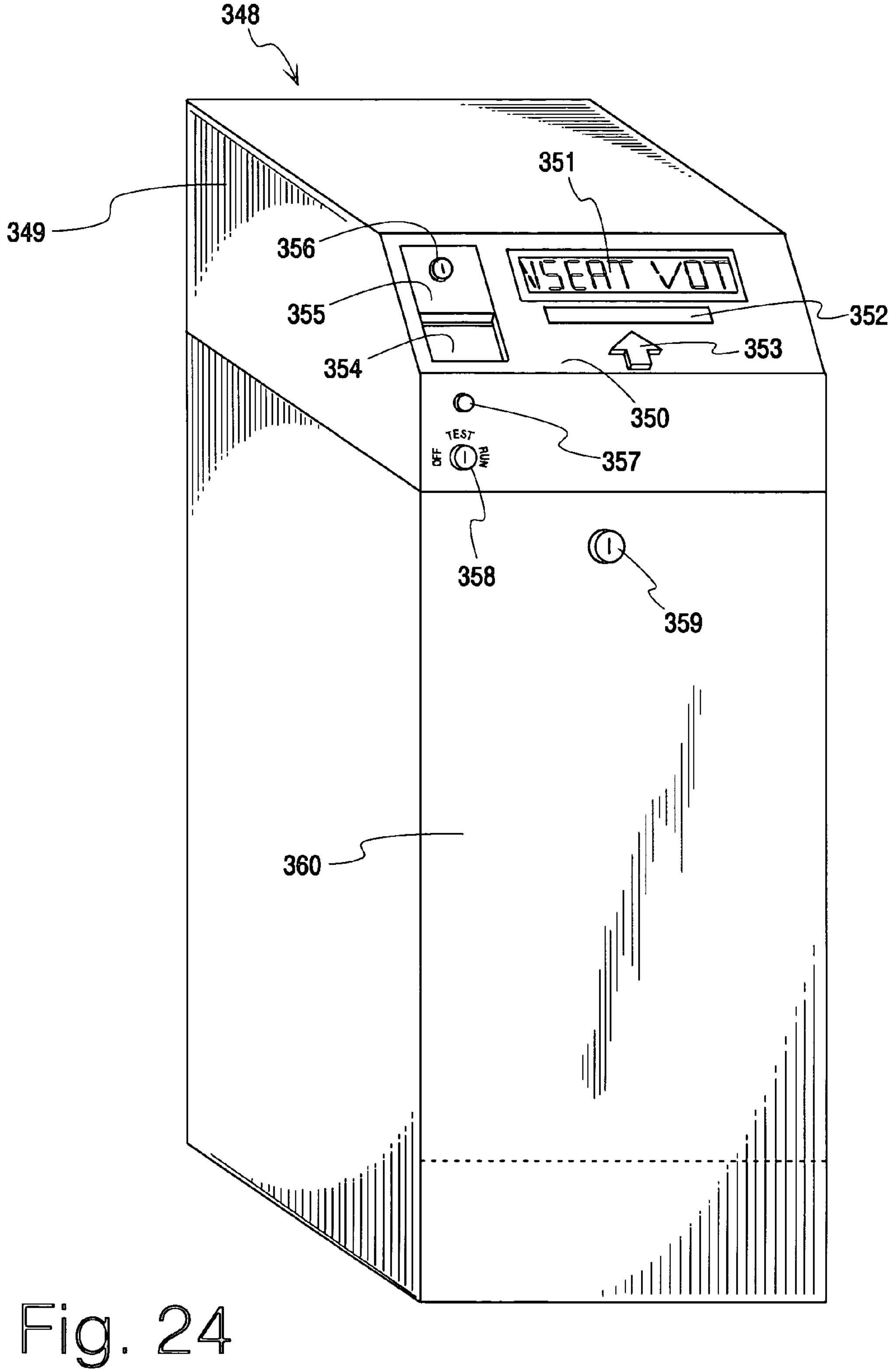
FIG. 24 is a perspective view of the reader terminal with the display scrolling "INSERT VOTER SELECTION CARD".

Referring to FIGS. 23 and 24, a voter selection card reader terminal 348 is seen to include a generally rectangular housing 349. The front face of the terminal housing 348 includes a sloped interface panel 350. Housing 349 further includes on the left side of its front surface an access door 355 for providing access to a memory card (not shown) in FIGS. 23 and 24 installed within the terminal to provide data regarding the style or format of ballots which is processed for reconciling stored voter selections. The transparent window 354 in access door 355 enables the access card to be viewed from the exterior of the terminal so that installation of the proper access card can be readily confirmed. A key lock 356 in the access door prevents unauthorized access to the data card.

A three-position key switch 358 is provided on a vertical panel of housing 349 to enable the operating mode of reader terminal 348 to be set. This key switch includes OFF, ON and TEST positions which can be selected by officials at the polling place and which the reader terminal is being used. An LED status light 357 above key switch 358 indicates the powered-up status of the terminal. In a preferred embodiment, this light displays a steady green to indicate operation on an AC line power with a fully charged battery, or a blinking green to indicate operation on the AC line with an inadequately charged battery. During battery operation, the LED status light displays a steady amber with the battery adequately charged, or a blinking amber with the battery inadequately charged. A power switch (not shown) on the rear panel of housing 349 provides a positive disconnect of all power from the terminal.

To provide for insertion of a voter selection card (FIG. 29), housing 349 includes at its front end a voter selection card receiving slot 352.

To provide a visual interface with a voter, reader terminal 348 includes display 351 and LED arrow 353 on sloped interface panel 350.

Reader terminal 348 also includes a reservoir door 360 that can be opened pursuant to the unlocking of key lock 359.

Figure 25:
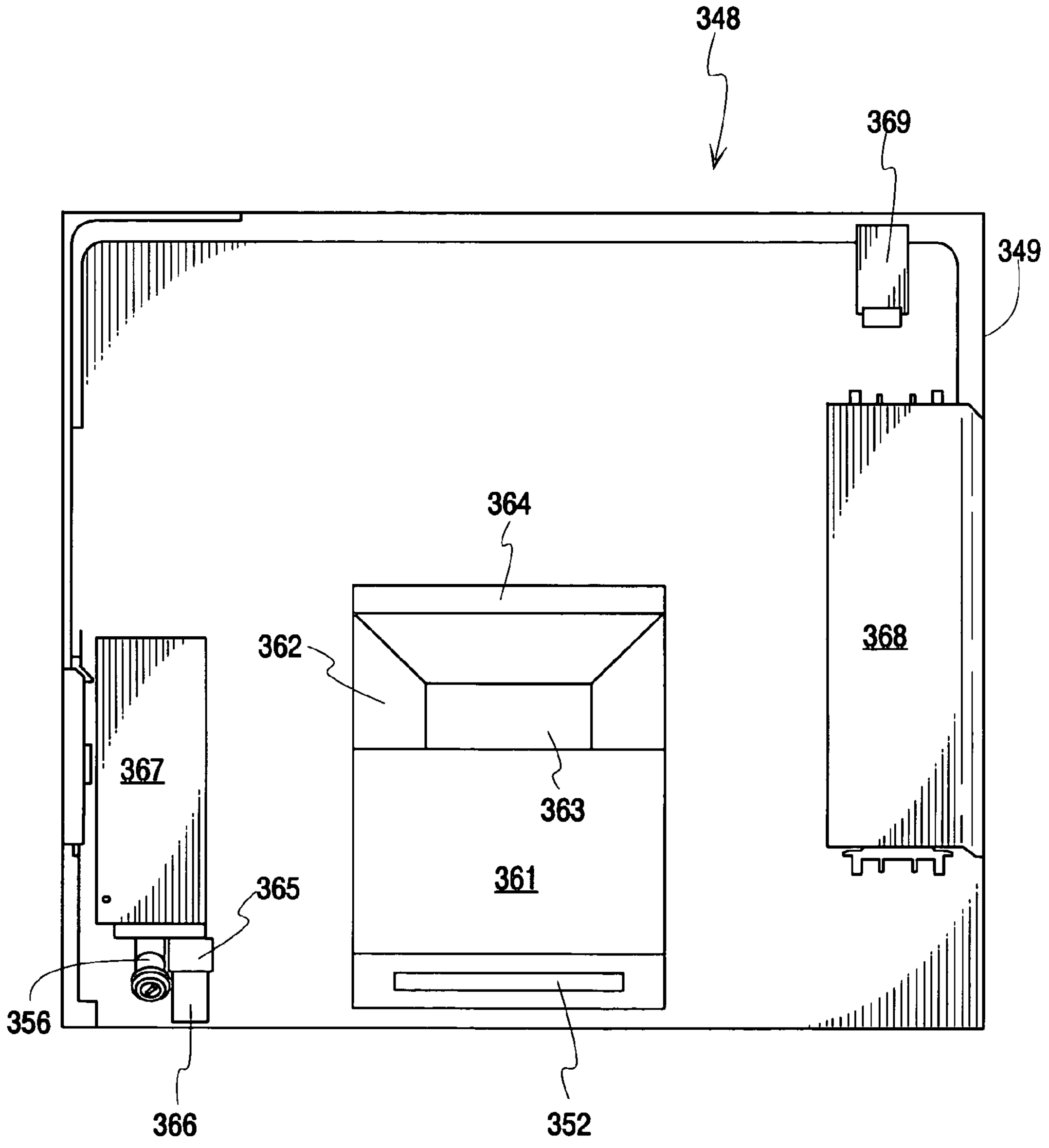
FIG. 25 is a top perspective view of the reader terminal with the top section of the housing removed to show the principal interior components of the terminal.

Voter selection card reader/eraser 361 of reader terminal 348 is shown in FIG. 25, which depicts the terminal with the top section of the housing removed. Additional components seen in FIG. 25 include a receptacle 369 for receiving AC power, a power supply module 368, a processor assembly 367, a reservoir shaft 362, a reservoir flap 364, and a reservoir 363.

Figure 26:
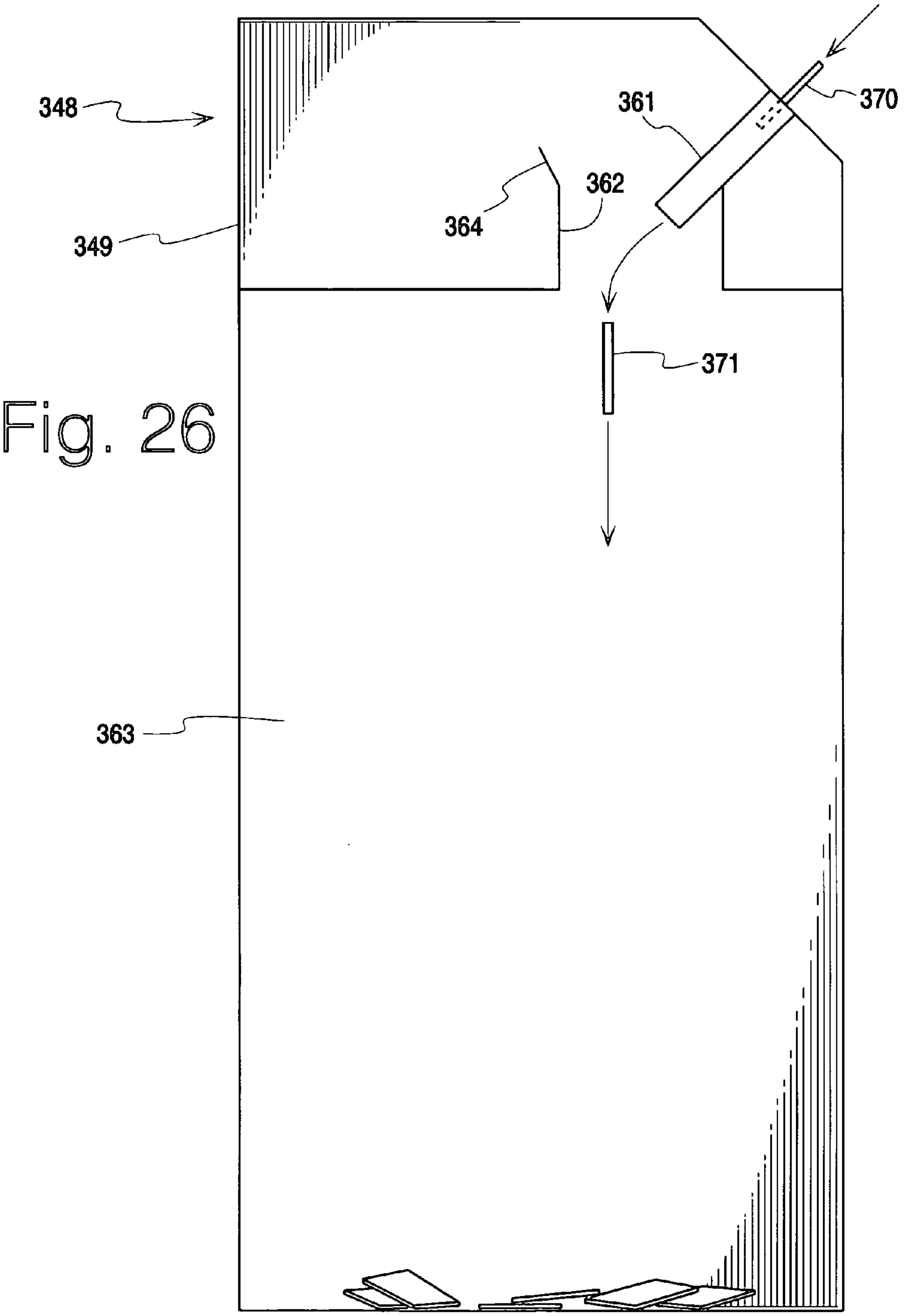
FIG. 26 is a simplified cross-sectional view of the reader terminal of FIGS. 23 and 24 showing the terminal accepting a stored voter selection card and then discarding it into a reservoir after the contest selection data has been erased.
Figure 30:
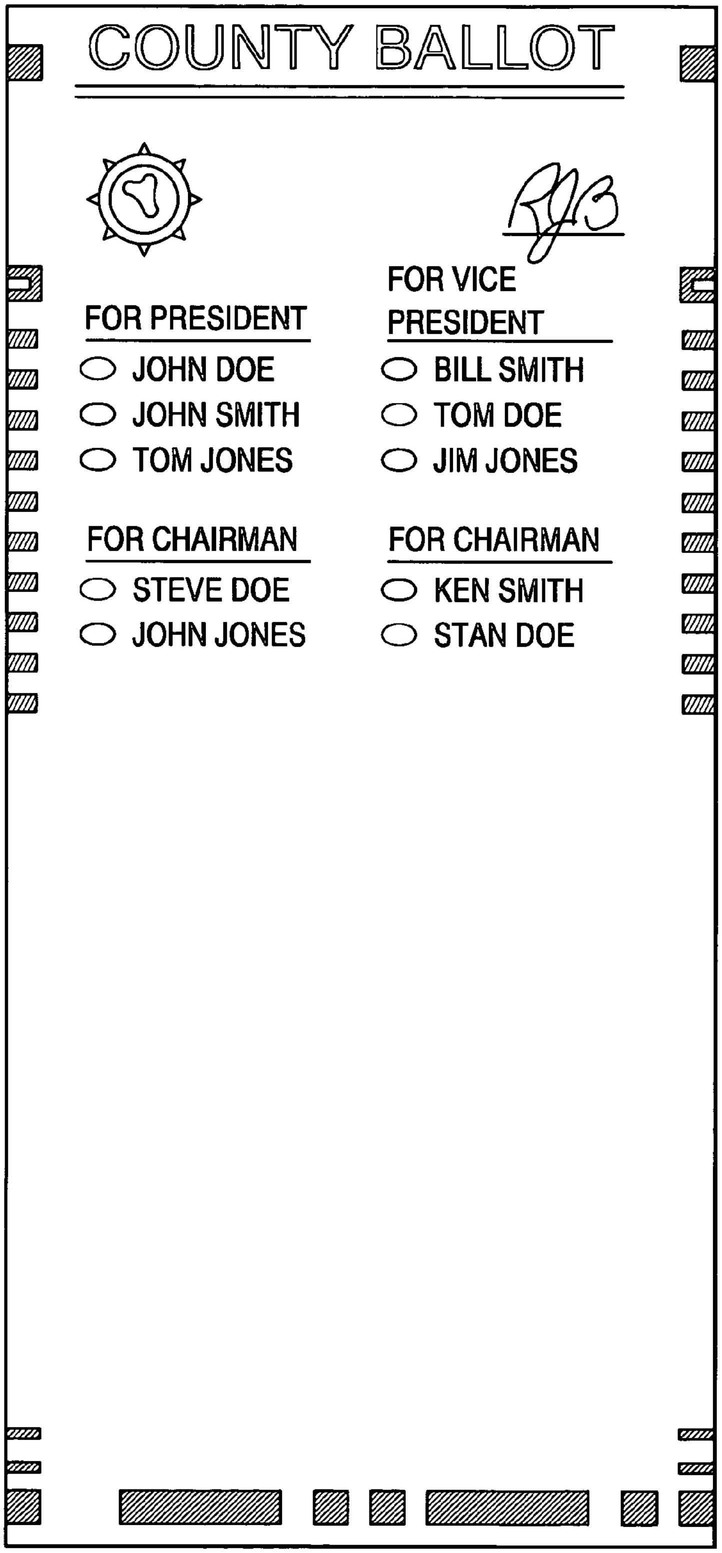
FIG. 30 shows a typical printed marked ballot for inserting into a scanner for tabulation.

As shown in FIG. 26, a stored voter selection card 370 is conveyed into reader terminal 348 by being inserted into data reader/eraser 361. After the stored selected data is read and sent to an attached printer 401 (FIG. 23) which prints a marked ballot (FIG. 30) corresponding to the contest selections on the stored voter selection card, the voter selection card data is erased by reader/eraser 361. After successful erasing, the erased voter selection card 371 is deposited from the back of the reader/eraser 361 into reservoir 363.

Figure 27:
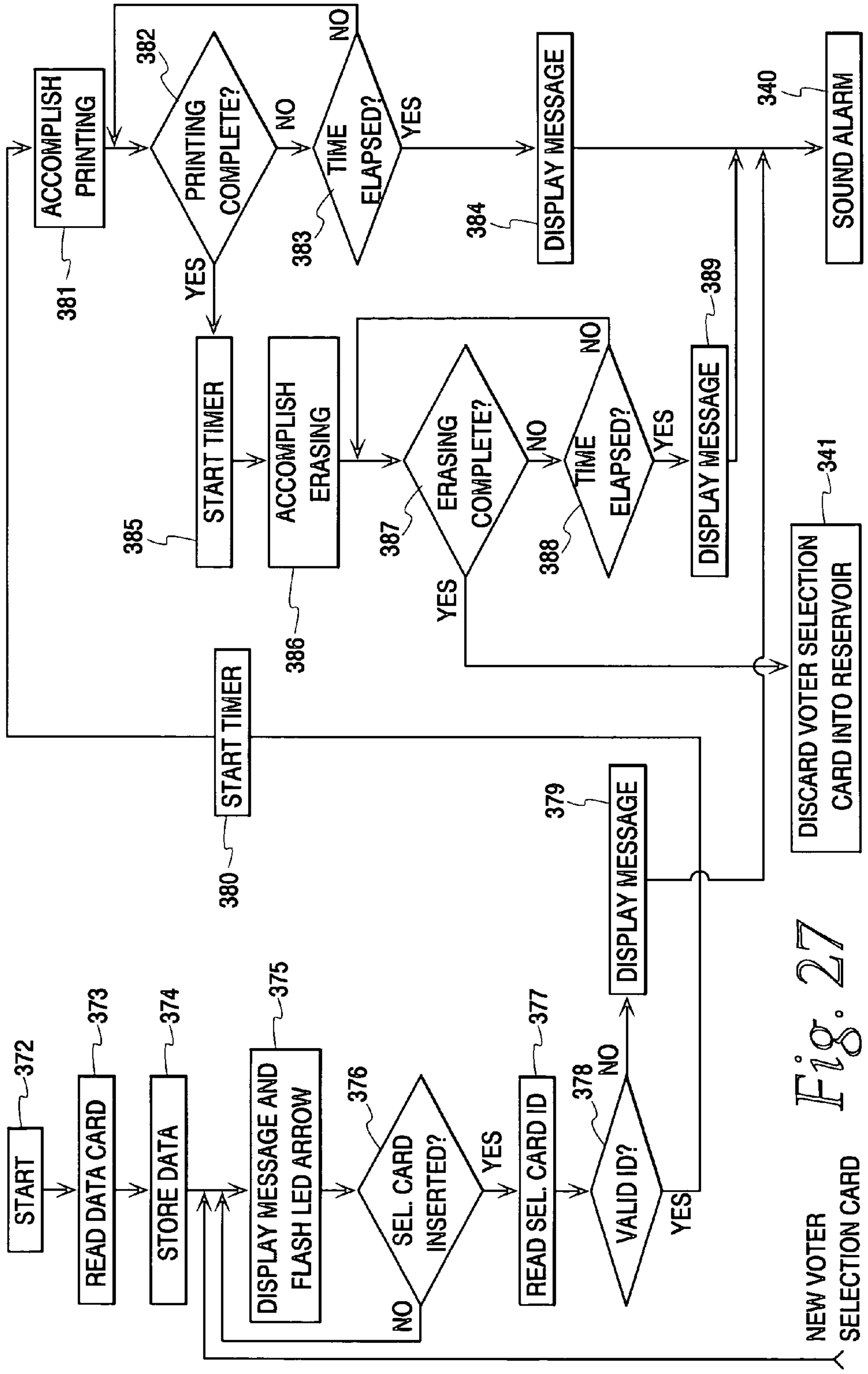
FIG. 27 show a simplified functional block diagram of the operation of the principal systems and subsystems of the reader terminal and standard printer of FIG. 23.

The functioning of reader terminal 348 may be understood by reference to the simplified flowchart shown in FIG. 27. Prior to operation, a pre-programmed compact flash card 366 is installed in a socket 365 (FIG. 25) to provide information on the layout of each ballot style used at a certain jurisdiction. On power-up of the terminal at 372 the compact flash data card is read at 373 and the appropriate ballot information is loaded into RAM within the computer module 367 at 374. The display 351 depicted in FIG. 24 is now showing the message INSERT VOTER SELECTION CARD and LED arrow 353 is flashing pending insertion of a voter selection card at 375. Upon insertion of a voter selection card at 376, an encrypted ID is read at 377 to verify that the voter selection card is authentic and may be used in the reader terminal at 378. If the ID is invalid, a message is displayed to this effect at 379 and an alarm is sounded at 340 to notify officials.

If the voter selection card is found to contain a valid ID at 378, then a timer is started at 380 and a marked ballot begins to be printed at 381. In the event printing has not been completed at 382, and the time allocated for the marked ballot to be printed has elapsed at 383, a message is displayed at 384 advising the voter of a terminal malfunction. An alarm is also sounded at 340 to alert election officials. In the event the printing process has been completed at 382, then a timer is started at 385 and the voter selection card begins to be erased by reader/eraser 361 at 386. In the event erasing has not been completed at 387, and the time allocated for the voter selection card to be erased has elapsed at 388, a message is displayed at 389 advising the voter of a terminal malfunction. An alarm is also sounded at 340 to alert election officials. In the event erasing has been completed in the appropriate time at 387, then the erased voter selection card is discarded into reservoir 363 at 341.

Thus, as shown in FIG. 27, reader terminal 348 functions to receive a stored voter selection card, by reference to data stored on a compact flash data card installed in the terminal, to print a corresponding marked ballot via an attached two-sided printer 401, and after successful printing, erases the voter selection data on the voter selection card and deposits it into reservoir 363 for future collection. The printed marked ballot is first inserted into a scanner for tabulation and then into a locked ballot box. No record of the voter's selections is maintained in the terminal 348.

Figure 28:
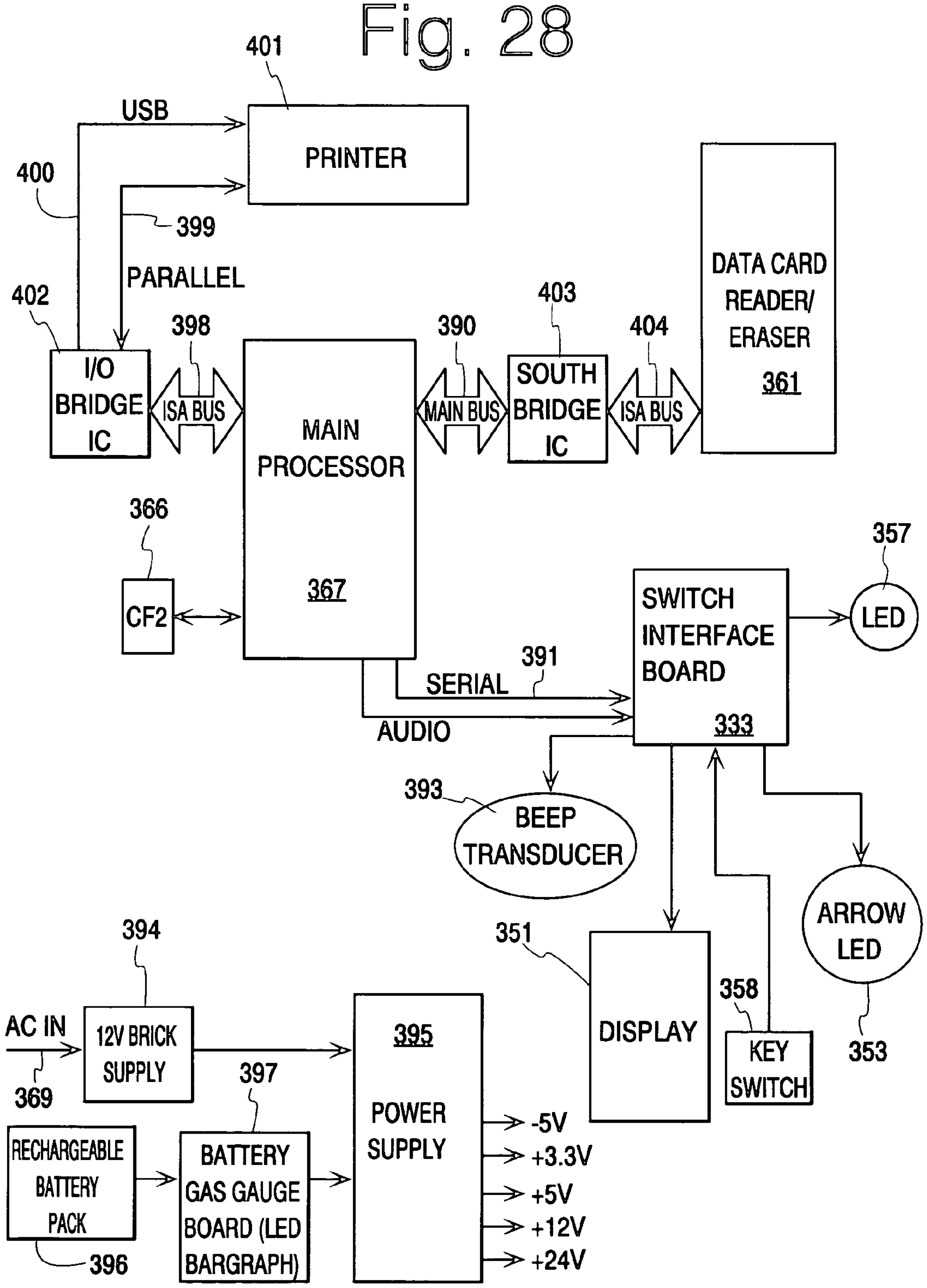
FIG. 28 is a simplified block diagram showing the principal circuits and components of the reader terminal of FIGS. 23 and 24.

Referring to FIG. 28, the various functions of reader terminal 348 are controlled by a main processor 367 and a data card reader/eraser 361. Processor 367 communicates with south bridge IC 403 by means of a main bus 390, and the south bridge IC 403 communicates with data card reader/eraser 361 by means of an ISA bus 404. Processor 367 communicates with an I/O bridge IC 402 via an ISA bus 398, and the I/O bridge IC 402 communicates with printer 401 by means of a USB connection 400 and parallel interface 399. Processor 367 also communicates with a switch interface board 392 by means of a serial I/O interface 391 and a parallel audio connection. Switch interface board 392 provides signals to the power supply/battery status LED 357, an optional beep key actuation transducer 393, display 351 and the arrow LED 353. Key switch 358 also provides input to board 392. Power supplied to terminal 348 in a conventional manner, a 12-volt brick supply 394 providing power to a switching power supply 395 which generates the necessary voltages for operation of the various circuits of the terminal. A rechargeable battery pack 396 provides power to the switching power supply 395. A battery gas gauge board 397 provides LED bar graph display (not shown) on the rear panel of the terminal to provide an indication of battery condition.

In a preferred embodiment of the invention, the voter selection card may be an integrated circuit memory card (FIG. 29) in which an embedded integrated circuit chip can store binary data by providing nonvolatile memory. The embedded circuitry communicates with both the voter-assist terminal and the reader terminal via electrical contacts on the surface of the voter selection card. The voter selection card's circuitry responds to low-level commands sent from the voter-assist terminal and the reader terminal resulting in data being stored and erased on the card or data being read from the card.

Yet, if more advanced circuitry is required such that the voter selection card may need to accomplish processing functions, then an integrated circuit microprocessor card (not shown) may be used. This card contains an embedded microprocessor that is connected to electrical contacts on the surface of the voter selection card similar to the integrated circuit memory card.

Even further, a contactless electromagnetic integrated circuit card (not shown) may also be used. This card does not require electrical contacts, but instead, it communicates with the voter-assist terminal and the reader terminal via electromagnetic, RF, signals. The contactless electromagnetic integrated circuit card can be adapted to have an embedded integrated circuit chip that only responds to low-level commands, acting only as a memory card or may have an embedded microprocessor for more advanced functionality.

While a particular embodiment of the invention has been shown and described, it will be obvious to those skilled in the art that changes and modifications may be made therein without departing from the invention in its broader aspects and, therefore, the aim of the appended claims is to cover all such changes and modifications as fall within the true spirit and scope of the invention.

We claim:

1. A voting system for recording voter selections from one or more election contests comprising:

a voter selection card;

a voter-assist terminal for receiving, storing data within, and returning said voter selection card;

a reader terminal for receiving said voter selection card;

a printer adapted to receive data from said reader terminal;

said voter selection card for receiving at least one data bit indicating the voter's selection of a candidate from one or more election contests, said voter selection card providing storage space for said data bit;

said voter-assist terminal displaying to the voter one or more menus in a language selected by the voter presenting a choice of candidates from the election contests, and for receiving an input from the voter indicating the selection of a candidate from said election contests, said voter-assist terminal receiving said voter selection card and in response to said voter input, storing said voter input on said voter selection card corresponding to said selected candidate and returning said voter selection card to the voter; and said reader terminal receiving said voter selection card and reading said voter input to send to said printer a signal, said printer being responsive to said signal to print a ballot marked in accordance with said voter input, said reader terminal further erasing or voiding said voter input data on said voter selection card after said printing and deposits said voter selection card within said reader terminal or returns said voter selection card to the voter.

2. A voting system as defined in claim 1 wherein a plurality of voter-assist terminals are used in conjunction with said reader terminal.

3. A voting system as defined in claim 1 wherein said voter selection card is a physical integrated circuit memory or microprocessor card, electromagnetic contactless memory card and/or chemical data storage card.

4. A voting system as defined in claim 1 wherein said printer is a duplex laser printer.

5. A voting system as defined in claim 1 wherein said menus presented to the voter are coordinated visual and aural menus.

6. A voting system as defined in claim 1 further comprising a sip and puff device for making said voter's selection of a candidate.

7. In a voting system utilizing a voter selection card given to a voter for recording selections of a voter via a voter-assist terminal, a reader terminal for receiving and reading said voter selection card, and a printer for printing a marked ballot in accordance with voter input, the method comprising:

an election judge distributing a voter selection card to a voter;

said voter receiving said voter selection card to insert into said voter-assist terminal;

said voter making voting selections via a visual and audio interface and storing said selections on said voter selection card via said voter-assist terminal;

said voter-assist terminal discharging said voter selection card to said voter to insert in said reader terminal;

said reader terminal reading voter input data and sending said data to said printer;

said printer printing out a printed ballot marked in accordance with voter input data;

said voter receiving said printed marked ballot and inserting into a scanner;

said scanner tabulating said printed marked ballot; and said printed marked ballot being deposited into a ballot box.

8. A voting system as defined in claim 7 wherein a plurality of voter-assist terminals are used in conjunction with said reader terminal.

9. A voting system as defined in claim 7 wherein said printer is a duplex laser printer.

10. A voting system for recording voter selections from one or more election contests, comprising:

a voter selection card;

a voter-assist terminal adapted to receive, store data within and return said voter selection card;

a reader terminal adapted to receive said voter selection card;

a printer adapted to receive data from said reader terminal;

said voter selection card being adapted to receive at least one data bit indicating the voter's selection of a candidate from one or more election contests, said voter selection card providing storage space for said data bit;

said voter-assist terminal displaying to the voter one or more menus presenting a choice of candidates from the election contests, and for receiving an input from the voter indicating the selection of a candidate from said election contests, said voter-assist terminal receiving said voter selection card and in response to said voter input, storing said voter input on said voter selection card corresponding to said selected candidate and returning said voter selection card to the voter; and said reader terminal receiving said voter selection card and reading said voter input to send to said printer a signal, said printer being responsive to said signal to print a ballot marked in accordance with said voter input, wherein said reader terminal erases or voids said voter input data on said voter selection card after said printing and deposits said voter selection card within said reader terminal or returns said voter selection card to voter.

11. In a voting system utilizing a voter selection card given to a voter for recording selections of a voter via a voter-assist terminal, a reader terminal adapted to receive and read said voter selection card, and a printer for printing a marked ballot in accordance with voter input, a reader terminal comprising:

a transport mechanism for receiving said voter selection card;

an indicator relating status of said reader terminal;

a memory device for storing ballot format data;

a card reader device responsive to the voter selection card for reading voter input data on said voter selection card for generating a signal for application to said printer to print a ballot marked in accordance with said voter selections, wherein said reader terminal erases or voids said voter input data on said voter selection card after said printing and deposits said voter selection card within said reader terminal or returns said voter selection card to voter.

* * * * *